(12) United States Patent
Endoh et al.

(10) Patent No.: US 6,967,651 B2
(45) Date of Patent: Nov. 22, 2005

(54) IMAGE DISPLAY METHOD AND IMAGE DISPLAY DEVICE

(75) Inventors: Toshio Endoh, Kawasaki (JP); Mitsuaki Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 10/162,594

(22) Filed: Jun. 6, 2002

(65) Prior Publication Data

US 2002/0180734 A1    Dec. 5, 2002

Related U.S. Application Data

(63) Continuation of application No. PCT/JP99/06832, filed on Dec. 6, 1999.

(51) Int. Cl.$^7$ .............................................. G06T 17/00
(52) U.S. Cl. ..................................................... 345/428
(58) Field of Search .............................. 345/419, 660, 345/661, 662, 664, 428

(56) References Cited

U.S. PATENT DOCUMENTS

| | | |
|---|---|---|
| 5,781,175 A | 7/1998 | Hara |
| 6,201,517 B1 | 3/2001 | Sato |

FOREIGN PATENT DOCUMENTS

| | | |
|---|---|---|
| JP | 62-248376 | 10/1987 |
| JP | 7-287775 | 10/1995 |
| JP | 9-190547 | 7/1997 |
| JP | 9-259130 | 10/1997 |
| JP | 10-239631 | 9/1998 |
| JP | 11-39132 | 2/1999 |
| JP | 11-45263 | 2/1999 |
| JP | 11-231993 | 8/1999 |

OTHER PUBLICATIONS

Furnas et al., Space-Scale Diagrams: Understanding Multi-scale Interfaces, May, 1995, ACM press, In Proceedings of CHI'95 Human Factors in Computing Systems.*

* cited by examiner

Primary Examiner—Almis R. Jankus
(74) Attorney, Agent, or Firm—Staas & Halsey LLP

(57) ABSTRACT

An image display method is provided, with which a large number of images to be searched can be displayed quickly in a 3D space, with easy to understand image rendering and little strain on the user's eyes. The method includes a process of reading in image data of a plurality of images and information about the arrangement of the images in the virtual 3D space; a spatial viewpoint setting/shifting process in which setting and shifting of a spatial viewpoint is specified; a process of converting original shapes of the image data by a parallel expansion projection process including a parallel shifting process regarding the directions of the images and a expansion/shrinking process regarding their size, based on a relation between the information about the arrangement of the images and the spatial viewpoint information, and determining a simplified 2D arrangement as a 2D image; a display image creation process of creating displayed images in accordance with the determined simplified 2D arrangement; and a process of displaying the display images. Through multi-resolution synthesized images and cut images and through the guiding display of a background image, an easy to understand image rendering is achieved, and the eye strain is evaluated and minimized on the basis of the optical flow.

20 Claims, 22 Drawing Sheets

Zoom  Scroll

IMAGE DISPLAY METHOD AND IMAGE DISPLAY DEVICE

This application is a continuing application, filed under 35 U.S.C. §111(a), of International Application PCT/JP99/06832, filed Dec. 6, 1999.

TECHNICAL FIELD

The present invention relates to a technique for quickly displaying images in a readily understandable manner on a display. More particularly, the present invention relates to a method for quickly displaying large number of images in 3D space, and a display method, which causes no strain on the eyes due to the zooming and scrolling of images. The invention can be applied, for example, to an electronic museum system or a visual image search (referred to as "browsing search" in the following) system.

BACKGROUND ART

As we are approaching the age of multimedia information, images are displayed increasingly often on the display of computers. In the course of the spread of the internet, techniques for retrieving the desired image information easily and accurately are growing more important. To find texts on the internet, keywords are effective for searching, and are used in practice on search sites. However, when searching for multimedia material, as typified by images, the use of keywords and the automatic extraction of raw information is still in the research stage, and in reality, browsing searches in which many candidates are presented as search results and judged by a human being are the rule. Techniques that make such browsing searches more efficient are becoming increasingly important.

On the other hand, the amount of multimedia data stored by individuals but also in office environments on computers grows year by year, increasing the importance of techniques for finding the desired data and viewing it efficiently. The general procedure for searching image data on the internet or the like by conventional techniques is largely as follows.

First, to restrict the desired data, the user uses a search site restricting candidates by keywords or the like, and limits the search scope somewhat with keywords or the like. Next, using image characteristics, such as the distribution of colors, the search scope is limited a little more. Furthermore, the search scope that has been restricted somewhat by the above restrictions is shown on a display, and the user performs a visual browsing search.

Consequently, it seems that browsing searches for images have the following features.

A first feature is that the number of image data sets to be displayed for browsing searches may be very large, and may go well into the hundreds or thousands. Often, the displayed objects are chosen from an enormous population, and which specimen is chosen depends on the restriction operation prior to the display, and often there is not much time for processing prior to the display. A second feature is that to perform the restriction, the population has to be read into the computer once, so that it can be assumed that the displayed objects are stored in a storage device of the computer on which the search is carried out. The displayed objects seem to have these properties not only for browsing searches, but also when viewing a large number of images managed by the user.

Furthermore, the following conditions are necessary when displaying a large number of images.

A first condition is that the displayed images have sufficient viewability. For this, a viewability to the extent that the user can grasp what is being displayed is sufficient, and a precise display of the details can be carried out separately, so that no overly precise display is required for list display.

A second condition is the perspicuity of the displayed images. Ensuring the perspicuity between displayed images has the advantages that it makes it easy to judge up to which of a large number of images have been visually checked, and that it facilitates the comparison of images.

A third condition is the ability to handle displayed images. Since the number of images is large, it is required that operations such as scrolling and zooming of the displayed images can be carried out sufficiently fast. Furthermore, improving the handling abilities also brings the advantage that it is not exhausting to continue the searching operation over a long time.

Typical approaches for display formats during browsing searches that have been used conventionally are as follows.

A first conventional browsing search format is that of displaying shrunk images (JP S62-248376A). Shrunk images (thumbnail images) of a plurality of images to be displayed are produced, and arranged on the display screen. This format has the advantage that it is easy to grasp which images have been viewed. However, as the number of displayed images becomes large, the individual images need to be small, so that there is the disadvantage that the details of an image become hard to see and difficult to grasp.

A second conventional browsing format is that of displaying the images distributed over several pages. With this format, the displayed images are not shrunk, or a certain shrinking ratio is not undercut, ensuring a certain size of the displayed images, and the displayed images are distributed across a plurality of pages, each holding as many images as fit onto one screen of the display. The pages can be displayed successively. This has the advantage that the individual images are easy to grasp, but the perspicuity is deficient, and it is not easy to judge how many images have been viewed, and there is also the disadvantage that the comparison of displayed images is difficult.

A third conventional browsing format is that of a scrolling display. The images are arranged on a large virtual screen allowing list display, and for the actual process of displaying on the display, a scroll function is provided that makes it possible to display a region of the size of the display as a portion of the large virtual screen. With this format, it is easier to compare with other images than with the page splitting format of the second browsing search format, but it still cannot be said to be sufficient.

A fourth conventional browsing format is that of arranging the images in a virtual 3D space for display. This format arranges the displayed images in a virtual 3D space. A function is provided, with which the viewpoint in the virtual 3D space can be shifted. When the viewpoint approaches individual images, the images are zoomed in. Due to our ability to grasp 3D space, it becomes easy to judge how much has been viewed and to compare with other images, and there is further the advantage that the viewability of individual images can be ensured, and that it is comparatively easy to grasp. A publicly known example is JP H09-259130A, which discloses a technique for arranging information hierarchically to perform browsing searches.

In order to obtain a displayed screen on the display (projection screen) with this conventional format of arranging and displaying in a virtual 3D space, 3D objects are projected onto the display by central projection (perspective projection). As shown in FIG. 22, this central projection connects points on the 3D object surface and points on the display by the following relation. Taking the direction of the line of sight as Z, the display is placed at, for example, a position of Z=1, and the points where the line segments connecting the projection center and one point on the 3D object surface intersects with the display are taken as the correspondence points. For Z, any value can be used except 1, which is the value where the display is placed. When (X, Y, Z) are the coordinates of the points on the 3D object surface, then the coordinates (x, y) of the points on the corresponding display are x=X/Z and y=Y/Z. In principle, a 3D display can be achieved by drawing all pixels on the 3D object surface as points on the display. The display is made of pixels, so that the process that is performed is that of allotting colors based on the above-described correspondence relation for all the pixels on the display. With this central projection, a display screen with a sense of realism can be attained, that is close to the appearance perceived by a human being when viewing from the projection center a 3D object that is placed in the virtual 3D space.

With this conventional technology, if images are placed in the virtual 3D space and displayed from a viewpoint that is set within that space using central projection, then the projection center in FIG. 22 becomes the viewpoint, and a display screen with a sense of realism can be attained, that is close to the appearance of the images placed in the virtual 3D space perceived from position of that viewpoint Consequently, if the number of displayed images is comparatively large, this format is excellent for displaying in 3D for browsing searches, but this format has the following problems.

A first problem is that for 3D displays the calculation amount increases in comparison to 2D displays, and the display processing takes considerable time. In 3D display processing, in particular when displaying large numbers of images on a display, the display speed drops, making this method difficult to use. To perform browsing searches by shifting the viewpoint, a smooth display is necessary when shifting, but when the display speed drops, it is not possible to perform smooth shifting, which severely impedes the convenience.

A second problem is that the content of individual images during viewpoint shifting becomes hard to grasp. If the viewpoint is shifted within the virtual 3D space, then, when the speed with which the viewpoint is shifted accelerates, the content of images shifting at high speeds becomes hard to grasp. Furthermore, since the viewpoint shifts within the 3D virtual space, the image may be warped due to the relation between the visual field angle and the images, and, if this warping changes due to a shifting of the viewpoint, the content of the images may be difficult to grasp intuitively.

A third problem is that even when a large number of small images is arranged in a virtual 3D space, they are difficult to be viewed as three-dimensional. It is difficult to grasp the stereoscopic depth, and the images appear rather as images of different size that are arranged two-dimensionally. In this case, it makes no sense to arrange them in 3D space, as this rather risks some confusion.

A fourth problem is that repeating the process of shifting the viewpoint may strain the user's eyes, making the process less convenient. For the user to grasp the content of an image that shifts in the virtual 3D space, the eye's viewpoint (focus point) needs to be shifted together with the shifting image, and this shifting of the viewpoint is one cause for strain on the eyes.

DISCLOSURE OF THE INVENTION

In view of the above-described problems, it is an object of the present invention to provide an image display method for virtually arranging and displaying images to be searched in a virtual 3D space, with which a large number of images to be searched can be displayed quickly in the virtual 3D space, and the image content can be grasped easily, even when the shifting speed of the viewpoint in the virtual 3D space is high. It is a further object of the present invention to provide an image display method by an image rendering technique with which an arrangement of images in the virtual 3D space can be grasped easily and intuitively. It is yet another object of the present invention to provide an image display method, with which the strain on the user's eyes is low even when shifting the viewpoint in the virtual 3D space.

In order to attain the object of displaying images to be searched quickly in the 3D space, an image display method for arranging and quickly displaying images in a virtual 3D space includes a process of reading in image data of at least one image; a process of reading in information about an arrangement of the images in the virtual 3D space; a spatial viewpoint setting/shifting process in which setting and shifting of a spatial viewpoint is specified with parameters including a viewpoint position and a line of sight direction in the virtual 3D space; a process of converting original shapes of the read-in image data by a parallel expansion projection process including a parallel shifting process regarding the directions in which the images are seen from the spatial viewpoint and a expansion/shrinking process regarding their size, based on a relation between the information about the arrangement of the images in the virtual 3D space and the spatial viewpoint information, and determining a simplified 2D arrangement expressing a 2D arrangement of the images seen from the spatial viewpoint as a 2D arrangement of images with shapes that are similar to the original images; a display image creation process of creating displayed images by processing the read-in image data in accordance with the determined simplified 2D arrangement of the images; and a process of displaying the created display images on a display device.

In addition to the display process using this parallel expansion projection process, it is possible to use, in combination, a display processing acceleration technique such as a process of projecting distant images with excessive shrinkage, a process of omitting small images, a process of omitting distant images, a process of omitting near images, an out-of-screen image omission process, or a process for efficiently determining concealment.

With these methods, it is possible to quickly display a large number of images to be searched in a virtual 3D space, using a simplified 2D arrangement attained by the parallel expansion projection process.

In order to attain the object of quickly displaying images to be searched in a 3D space by rendering easy to understand, an image display method for arranging and displaying images in a virtual 3D space includes an image data reading process of reading in image data of at least one image with at least one resolution, wherein the image data are multi-resolution image data made of a set of image data of at least one resolution; a process of reading in information about an arrangement of the images in the virtual 3D space; a spatial viewpoint setting/shifting process in which setting and shifting of a spatial viewpoint is specified with parameters including a viewpoint position and a line of sight direction in the virtual 3D space; a process of determining a 2D arrangement of position, orientation and size of the images seen from the spatial viewpoint, by performing a projection process based on a relation between the information about the arrangement of the images in the virtual 3D space and the spatial viewpoint information; a display image creation process of selecting the image data of at least one resolution from the read-in multi-resolution image data, in accordance with the determined 2D arrangement, and writing them into display images to create the display images; and a process of displaying the created display images on a display device.

Furthermore, an image display method in accordance with the present invention for displaying images to be searched in a 3D space with rendering easy to understand includes a process of reading in image data of at least one image; a process of reading in information about an arrangement of the images in the virtual 3D space; a spatial viewpoint setting/shifting process in which setting and shifting of a spatial viewpoint is specified with parameters including a viewpoint position and a line of sight direction in the virtual 3D space; a process of determining a 2D arrangement of position, orientation and size of the images seen from the spatial viewpoint, by performing a projection process based on a relation between the information about the arrangement of the images in the virtual 3D space and the spatial viewpoint information; a display image creation process of writing cut image data in which a region of a size of an image of the 2D arrangement has been cut from the written image data in accordance with the determined 2D arrangement into the display images, to create the display images; and a process of displaying the created display images on a display device.

In addition to the multi-resolution image synthesis display process and the display process cutting out an essential region, it is possible to use, in combination, image rendering techniques such as a process for displaying a substitute for an omission, a process for limiting the range throughout which the viewpoint can be shifted, a process for highlighting a certain image, a process for displaying coordinate axes or the like, a process for displaying images with frames, and a process of spreading out the arrangement of images.

With these methods, it is possible to perform image rendering that is suitable for the display of a large number of images in a virtual 3D space that is easy to understand for the user, by using a multi-resolution image synthesis display process or a display process cutting out an essential region or the like.

In order to attain the object of making the arrangement position of the images arranged in the virtual 3D space easier to understand, an image display method for arranging and displaying images in a virtual 3D space includes a process of reading in image data of at least one image; a process of reading in information about an arrangement of the images in the virtual 3D space; a process of reading in image data of a background image that exists virtually as a background in the virtual 3D space; a process of reading in information about an arrangement of the background image in the virtual 3D space; a spatial viewpoint setting/shifting process in which setting and shifting of a spatial viewpoint is specified with parameters including a viewpoint position and a line of sight direction in the virtual 3D space; a process of determining a 2D arrangement of position, orientation and size of the images and the background image seen from the spatial viewpoint, by performing a projection process based on a relation between the information about the arrangement of the images and the background image in the virtual 3D space and the spatial viewpoint information; a display image creation process of creating display images by processing the read-in image data and background image data in accordance with the determined 2D arrangement of the images and the background image; and a process of displaying the created display images on a display device.

With this method, it is possible to display a background object image serving as a guide for making the arrangement positions in the virtual 3D space easier to understand, and to render the images in the virtual 3D space in an easy to understand manner.

In order to attain the object of providing an image display method without strain on the eyes of the user, an image display method for displaying an image while shifting it includes a process of reading in image data; a process of reading in a shifting parameter specifying how the image is shifted; a shifting parameter/image data adjustment process of reducing a viewpoint shifting deviation, which is a difference between an optical flow determined between display images of frames that are adjacent in time and the actual movement of pixels of the image, based on the read-in image data and shifting parameter, and adjusting at least one of the shifting parameter and the image data such that a shifting amount of the image between frames that are adjacent in time is increased; a display image creation process of creating display images by processing the read-in image data and background image data in accordance with the adjusted shifting parameter or image data; and a process of displaying the created display images on a display device.

With this method, using a shifting parameter optimization processing method of an image display process of the present invention, strain on the eyes of the user performing a browsing search or viewing the images can be suppressed by optimizing a shifting parameter based on the optical flow.

BEST MODE FOR CARRYING OUT THE INVENTION

Figure 1:
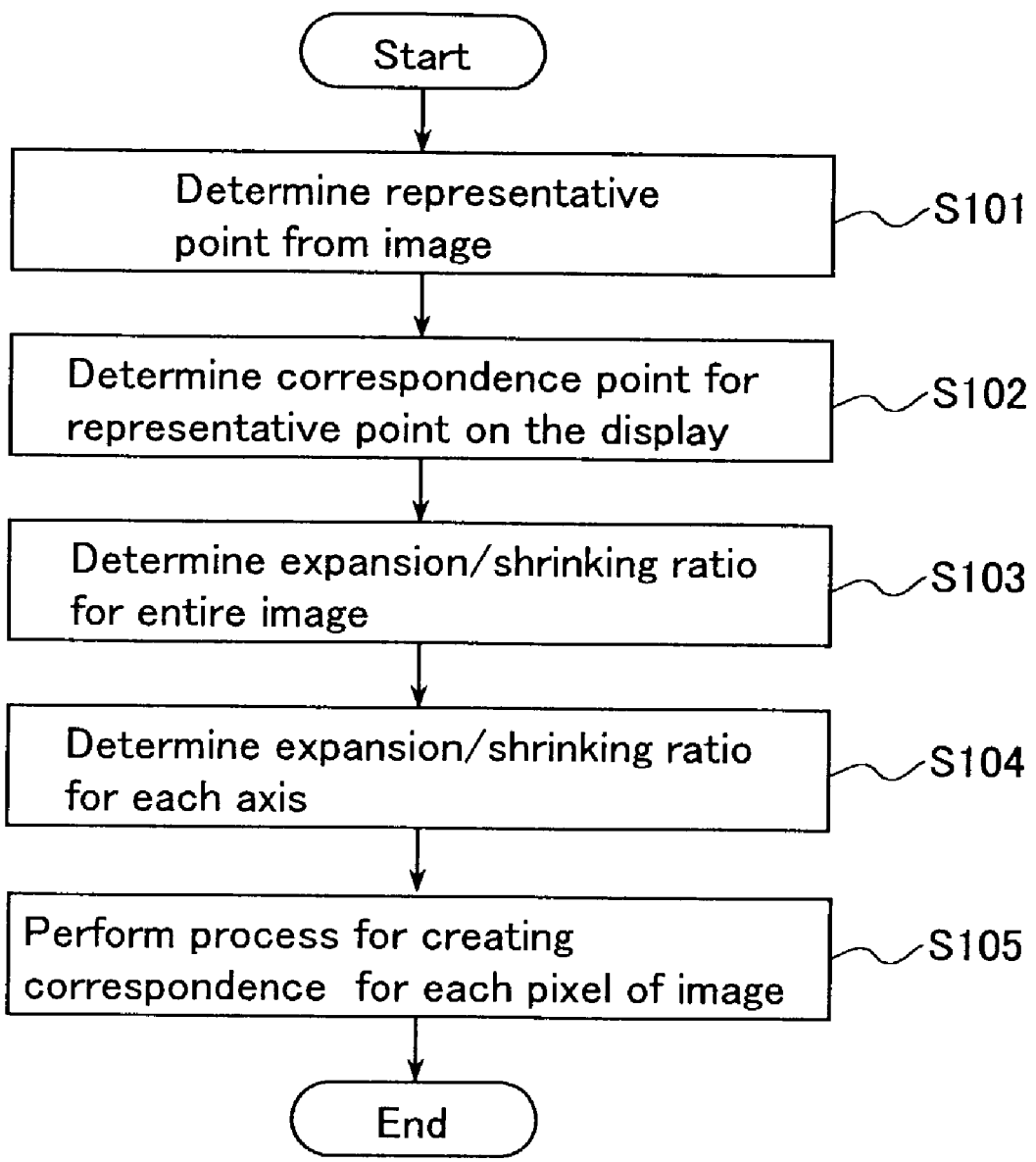
FIG. 1 is a flowchart showing the basic procedure of the parallel expansion projection process of Embodiment 1 of the present invention.

The following is an explanation of embodiments of an image display method according to the present invention, with reference to the drawings.

The image display method of the present invention displays images within 3D space by combining one or more of the following basic techniques of the present invention.

The first basic technique is a 3D display processing acceleration technique optimized for the display of a large number of images. For this 3D display processing acceleration technique, a plurality of new display processing acceleration techniques are disclosed in the present invention, which can be used in suitable combinations. As explained below, display processing acceleration techniques that can be used in combination include for example a display process using a parallel expansion projection process, a process of projecting distant images with excessive shrinkage, a process of omitting small images, a process of omitting distant images, a process of omitting near images, an out-of-screen image omission process, and a process for efficiently determining concealment. These display processing acceleration techniques are explained in more detail in Embodiment 1 below.

The second basic technique is a 3D image rendering technique optimized for the display of a large number of images. For this 3D display processing acceleration technique, a plurality of new image rendering techniques are disclosed in the present invention, which can be used in suitable combinations. As explained below, image rendering techniques that can be used in combination include a multi-resolution image synthesis display process, a display process cutting out an essential region, a process for displaying a substitute for an omission, a process for limiting the range throughout which the viewpoint can be shifted, a process for highlighting a certain image, a process for displaying coordinate axes or the like, a process for displaying images with frames, and a process of spreading out the arrangement of images. These display rendering techniques are explained in more detail in Embodiment 2 below.

The third basic technique is a 3D space rendering technique using a background image. This 3D space rendering technique using a background image is explained in detail in Embodiment 3 below.

The fourth basic technique is a process technique for optimizing a shifting parameter. This technique suppresses eye strain by optimizing shifting parameters based on an optical flow. This shifting parameter optimization process technique is explained in detail in Embodiment 4 below.

It should be noted that the above-mentioned 3D display processing acceleration technique, 3D image rendering technique, 3D space rendering technique using a background image and shifting parameter optimization process technique can be applied independently from one another or used in suitable combinations as techniques for improving image display processing.

In the following explanations, "image" and "display" are used in the following sense, which is standard usage. An "image" is an array filled two-dimensionally with small rectangular regions called "pixels." An image with many pixels is referred to as "high-resolution image" or "large image," whereas an image with few pixels is referred to as "low-resolution image" or "small image." For each pixel, it is possible to set a color (here, this includes brightness as well) through a set of several numerical values. The RGB format is one example of a method for associating a set of numerical values with colors. In RBG format, when each color component is expressed by 8 bits, the brightest color, white, is attained by (255, 255, 255), for example.

"Display" means a display device which can be physically viewed by a user. Colors can be displayed at corresponding locations of a display by correspondingly writing numerical values into a special memory of a computer. Consequently, it can be regarded as one special image in the display format. In the present invention, "display" is used in this sense.

The following is an explanation of the basic techniques for achieving the image display method of the present invention.

Embodiment 1

Embodiment is a 3D display processing acceleration technique optimized for the display of a large number of images, which is one of the basic techniques for the image display method of the present invention.

First, as one 3D display processing acceleration technique optimized for the display of a large number of images according to the present invention, an image creation process in accordance with a simplified 2D arrangement by parallel expansion projection is explained.

As explained in the prior art section, using a conventional central projection, a spatial viewpoint is taken as the projection center, and a display screen with a sense of realism can be attained that is close to the appearance when viewing the images arranged in the virtual 3D space.

However, as explained in the prior art section, this may lead to various problems, such as problems with the display processing speed. The present invention does not use a central projection, but uses a projection method attaining transformed images that are sufficient for browsing searches and viewing.

There is the possibility that ordinary 3D objects are arranged in various orientations depending on the angle at which they are arranged, but for browsing searches and viewing, the priority is on making it easy to grasp what the displayed images are, so that the images should be displayed such that they face the direction of the line of sight. When the orientation of the images is determined in this manner, a rectangular image, for example, will also be displayed with rectangular shape on the display. That is to say, taking a certain position on the display as the center, a transformed image obtained by expanding/shrinking or rotating an original image is displayed. Here, the contour stays the same as the original shape of the original image. In particular, if the direction of the pixels of the images (direction of the straight line attained by connecting neighboring pixels) is parallel to the direction of the pixels on the display, that is, if the rectangular image data face the display without tilting, then a rotation process is unnecessary. Furthermore, considering top, bottom, left and right, the rotation angle is a multiple of 90° (i.e. 0°, 90°, 180° or 270°). For actual browsing searches and viewing, images are mostly displayed in this manner, and the purpose of browsing searches and viewing can be sufficiently attained with this kind of display.

In the present invention, when determining the projection of the images arranged within virtual 3D space on to the display, the image data are subjected to a projection transformation by performing a parallel shifting process corresponding to the direction of the images seen from the spatial viewpoint, and a parallel expansion projection process, in which only an expansion/shrinking process corresponding to the direction of the image seen from the spatial viewpoint is performed, based on the relation between the arrangement of the images within virtual 3D space and the spatial view point information. A process for rotating by a multiple of 90° under consideration of top, bottom, left and right can also be included for the parallel expansion projection process.

With this parallel expansion projection process, it is possible to determine a simplified 2D arrangement in which the 2D arrangement of the images that can be seen from the spatial viewpoint is rendered as a 2D arrangement of images similar to the original images. The display process using the simplified 2D arrangement according to this parallel expansion projection process merely includes subjecting the original image data to a parallel projection process, an expansion/shrinking process, and a process for rotating for a multiple of 90°, so that it can be carried out faster than an ordinary central projection process or a rotation process for any desired angle. Thus, a 2D arrangement on the display screen of image writing frames whose shapes are similar to the original shapes of the image data is determined, and writing the displayed images using the original image data on these image writing frames, high-speed processing with a low process calculation amount becomes possible.

The projection process and the display process are simplified, and the processing is accelerated by displaying the displayed images in a simplified 2D arrangement that is sufficient for browsing searches and viewing, and only with a parallel expansion projection transformation, regardless of the actual visual observation with which the images placed in the virtual 3D space are viewed in space.

It should be noted that in the field of computer vision, which researches the processing for determining 3D information from images, weak perspective projection and paraperspective projection are used as an approximation of central projection. These two projections match central projection in the case that the display and the images are parallel in the virtual 3D space. Even if that is not the case, if the direction of the pixels of the images and the direction of the pixels of the display are parallel, then weak perspective projection matches parallel expansion projection. Consequently, the parallel expansion projection of the present invention can be said to be a generalized weak perspective projection carrying out the projection for any 3D arrangement by a parallel shifting process, an expansion/shrinking process, and a process of rotating by a multiple of 90°.

The basic procedure of the parallel expansion projection process of the present invention is explained in greater detail in the flowchart of FIG. 1.

First, representative points in the images are determined (Step S101). One representative point is selected for each of the images to be displayed. The representative point may be the center of gravity, for example.

Next, correspondence points of the representative points on the display are determined (Step S102). For this, the point $(x_0, y_0)$ at which the line segment connecting the representative point determined in Step S101 and the spatial viewpoint passes through the display is taken as the correspondence point for the representative point on the display.

Next, the expansion/shrinking ratio of the entire image is determined (Step S103). Here, the inverse of Z0, which is the Z-value of the representative point determined in Step S102, is taken as the expansion/shrinking ratio of the entire image.

Next, the expansion/shrinking ratios for each axis are determined (Step S104). The expansion/shrinking ratios for each axis are determined as follows. First, an orthogonal coordinate system u, v is introduced on the image. The representative point is taken for the origin of this coordinate system u, v. The components in the XYZ coordinate system of the unit vectors (length of the pixel spacing) for the directions u and v are $(V_X, V_Y, V_Z)$ and $(V_X, V_Y, V_Z)$. Here, if $|u_X| \geq |v_X|$, then the u-axis is multiplied by $u_X$ and taken to correspond to the X-axis, whereas the v-axis is multiplied by $v_Y$ and taken to correspond to the Y-axis. That is to say, the point (u, v) on the image is taken to correspond to $(u_X u, u_Y v, Z_O)$ in the XYZ coordinate system. Conversely, if $|u_X| < |v_X|$, then the v-axis is multiplied by $v_X$ and taken to correspond to the X-axis, whereas the u-axis is multiplied by $u_Y$ and taken to correspond to the Y-axis.

Next, a process for creating a correspondence for each pixel of the image is performed (Step S105). The pixels (u, v) of the image are converted into values on the X and Y-axis by multiplication with the expansion/shrinking ratio of each axis, and then the expansion/shrinking ratio is applied to the entire image. This is taken to be $\delta_x$ and $\delta_y$. The pixels on the display corresponding to the pixels are thus $(x_O + \delta_x, y_O + \delta_y)$. However, the expansion/shrinking ratios for each axis can also be defined as other values than above. For example, it is also possible to define $(u^2_x + u^2_y)^{1/2}$, $(v^2_x + v^2_y)^{1/2}$. The present invention can be applied without any limitation to the details of the expansion/shrinking ratios.

The foregoing is the basic procedure of the parallel expansion projection of the present invention.

Figure 2:
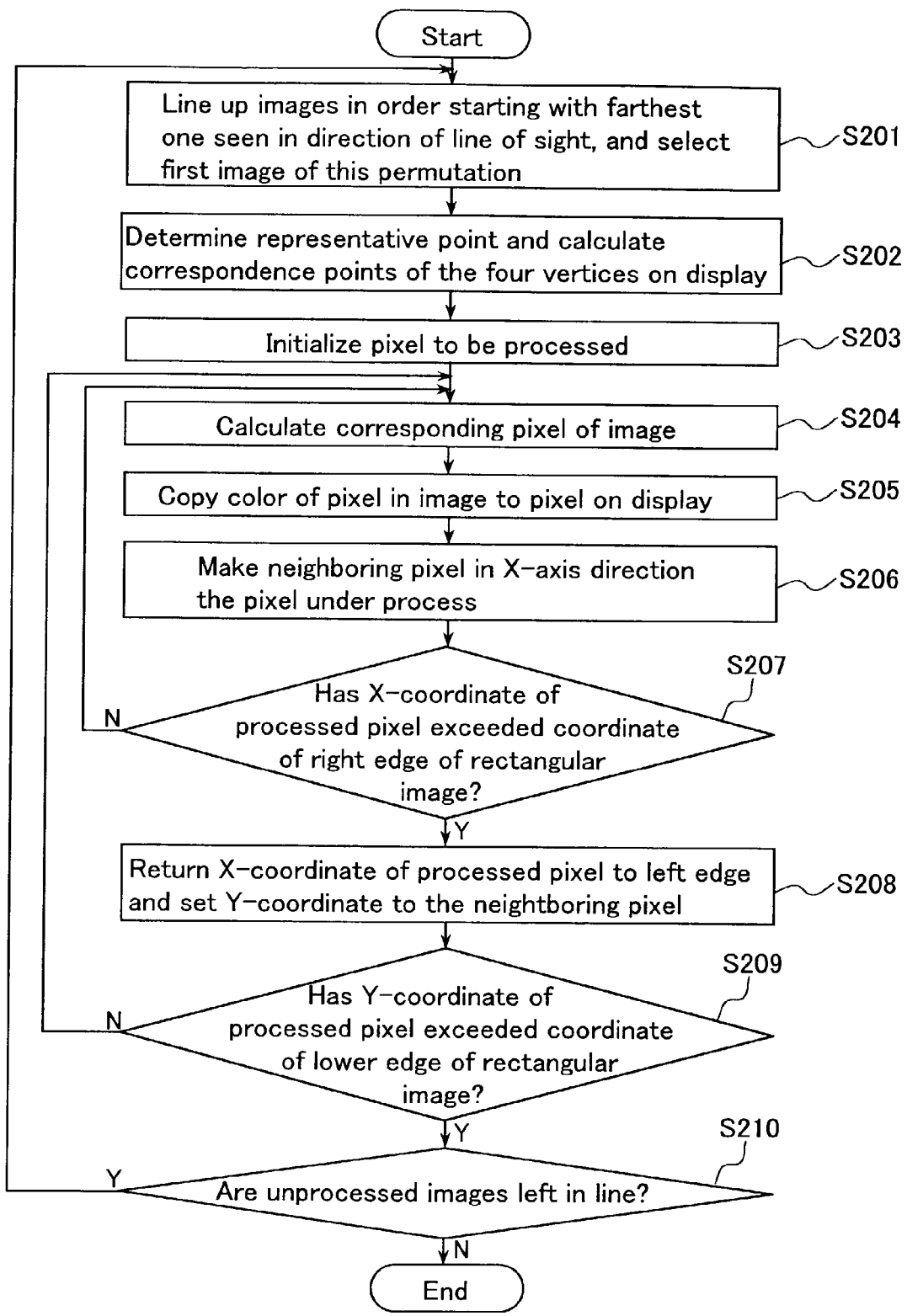
FIG. 2 is a flowchart illustrating an example of the process for calculating the projection of a rectangular image on a display using the parallel expansion projection of Embodiment 1 of the present invention.

Next, taking an example in which the projected image is rectangular, the flowchart in FIG. 2 illustrates an example of the process for calculating the projection of a rectangular image on a display using parallel expansion projection.

First, the images subjected to parallel expansion projection processing are lined up in order starting with the farthest one seen in the direction of the line of sight, and the first image of this permutation is selected (Step S201).

Next, as indicated in Step S101 in the flowchart of FIG. 1, a representative point in this image is selected, and as indicated in Step S102 in the flowchart of FIG. 1, the representative point of the image projected onto the display is calculated, and then the correspondence points of the four vertices are calculated (Step S202). The expansion/shrinking ratio is determined from the coordinates of the representative point of the selected image, and the coordinates $(X_1, Y_1)$, $(X_1+w_1, Y_1)$, $(X_1, Y_1+h_1)$, and $(X_1+w_1, Y_1+h_1)$ of the four vertices of the rectangle projected onto the display are determined from the coordinates of the four vertices.

Next, the pixels to be processed are initialized (Step S203). Here, the pixel (i, j) on the display to be processed is set to $(X_1, Y_1)$.

Next, the corresponding pixel of the image is calculated (Step S204). The pixels (I, J) in the image corresponding to the pixel (i, j) on the display is determined.

Next, the color of the pixel in the image is copied to the pixel on the display (Step S205). Here, the color of the pixels (I, J) in the image is copied to the pixel (i, j) on the display.

Next, the processed pixel is shifted. First, a shift in the X-axis direction is performed. The processed pixel is set to the neighboring pixel in X-axis direction by increasing i by 1 (Step S206). If $i=X_1+w_1+1$ (Step S207: Y), then this means that the rectangular image range has been exceeded in X-axis direction, so that the X-coordinate of the processed pixels returns to the left edge, and then a shift in the Y-axis direction is carried out. That is to say, the X-coordinate returns to i=X1, and j is increased by one (Step S208). If $j=Y_1+h+1$ (Step S209: Y), then this means that the rectangular image range has been exceeded in Y-axis direction, so that the processing has been finished for the pixels in the entire rectangular image range, and the procedure returns to Step S201 to select the next image.

If i has not yet reached $X_1+w_1+1$ in Step S207 (Step S207: N), or if j has not yet reached $Y_1+h+1$ in Step S209 (Step S209: N), then the procedure returns to Step S204, and the calculation of the corresponding pixels of the image, and the copying of the color of the pixels in the image to the pixels on the display is carried out again (Step S205).

The procedure from Step S204 to Step S209 is repeated, and when $j=Y_1+h+1$ is reached in Step S209 (Step S209: Y), then it is confirmed whether an image is left in the line, and if an image is left (Step S210: Y), then the procedure returns to Step S201, and the above procedure is repeated.

If no image to be selected is left (Step S210: N), the procedure ends. Here, the case that no image to be selected is left also includes the case that the representative point of the selected image lies behind the position of the viewpoint (Z<0).

The foregoing is an example for the procedure for determining two-dimensionally arranged images on a display using a parallel expansion projection on the image data of rectangular images.

Figure 3A:
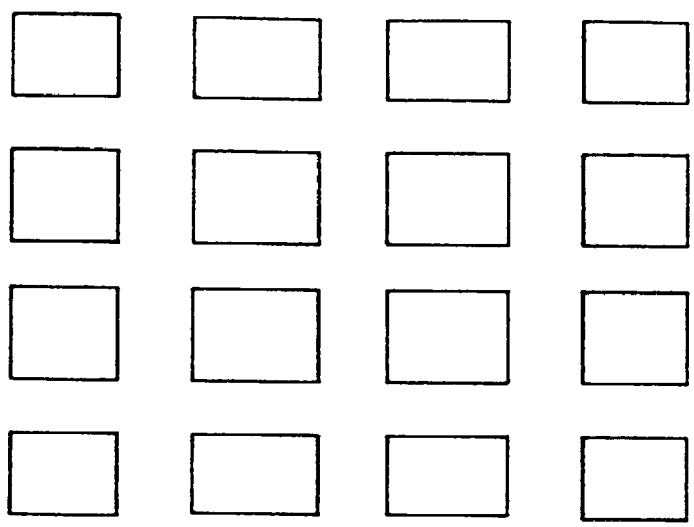
FIG. 3 shows an example of displayed images using the simplified 2D arrangement according to the parallel expansion projection processing of Embodiment 1 of the present invention, and an example of two-dimensionally displayed images according to the central projection process of the prior art.
Figure 3B:
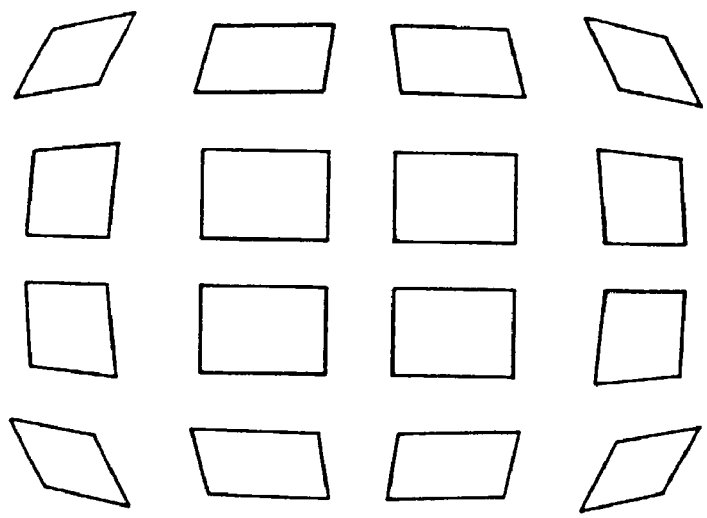

FIG. 3 shows an example of displayed images using the simplified 2D arrangement according to the parallel expansion projection processing of the present invention, and an example of two-dimensionally displayed images according to the central projection process of the prior art. Here, the original images are rectangular images. As shown in FIG. 3(a), in the example of the images displayed with the simplified 2D arrangement according to the parallel expansion projection process of the present invention, the displayed images are similar to the rectangular original images, which have been subjected only to parallel shifting, expansion/shrinking and rotation, thus allowing a high-speed display process. In the example of two-dimensionally displayed images according to the central projection process of the prior art in FIG. 3(b), images are attained that are close to the images in the virtual 3D space when viewed from a spatial viewpoint, but the image processing amount is large, and high-speed display processing is difficult.

The following is an explanation of a second technique for accelerating the 3D display process in accordance with the present invention.

The second technique for accelerating the 3D display process is a technique for accelerating the 3D display process using multi-resolution images. Combining it with the display image processing using the simplified 2D arrangement of the above-described parallel expansion projection process, it can contribute to accelerating the 3D display process. It should be noted that, as explained in Embodiment 2, this 3D image display process using multi-resolution images can also be used from the standpoint of a 3D image rendering technique optimized for the display of a large number of images. In this Embodiment 1, it is discussed as a technique for accelerating the 3D display process.

Since the number of images to be processed may be enormous, an enormous read-in time and memory capacity is necessary to read in all images and place them in the main memory.

When the images to be displayed are arranged in 3D space, the images located far away are displayed small, and often a low resolution will be sufficient. Thus, it is possible to adjust the resolution in accordance with the distance from the spatial viewpoint and the display size of the image. By using shrunk images, it is possible to achieve display acceleration and to save memory. Utilizing these features, in the technique for accelerating the 3D display process using multi-resolution images in accordance with the present invention, the data for a plurality of images with different resolutions are prepared for the images to be displayed, and when writing them as 2D display images, the image data with the resolution that is closest to the resolution suitable for the distance from the spatial viewpoint and the display size of the image are selected, and the image display process is performed using these image data.

Figure 4:
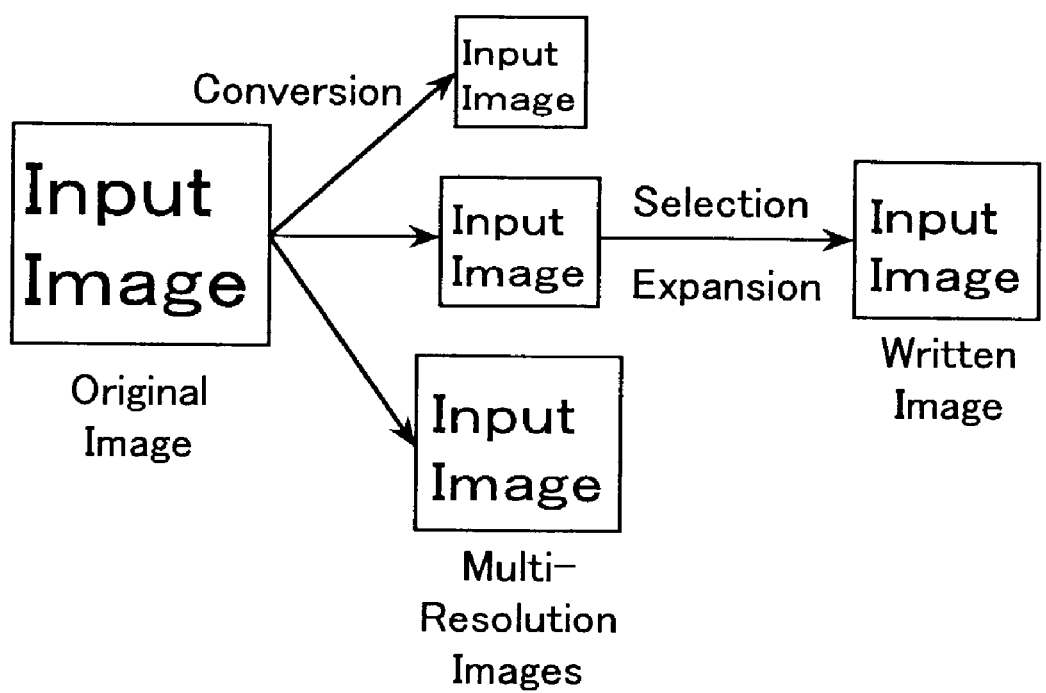
FIG. 4 illustrates an example of creating a display image using multi-resolution images.

FIG. 4 illustrates an example of creating the display image using multi-resolution images. As shown in FIG. 4, multi-resolution image data for a plurality of different sizes are prepared from the original image data. Here, a simple expansion/shrinking of the content of the image in accordance with the size is carried out beforehand. After the position and the size of the frame into which the image is written have been decided as a result of the projection, process, that image of the multi-resolution images that has the size closest to the image writing frame is selected, and fine-tuning of expansion/shrinking is performed if necessary.

Thus, by selecting the image data with the appropriate resolution from hierarchically arranged multi-resolution images, the amount of image data can be reduced, so that the calculation amount can be decreased, and the display process can be accelerated.

The following is an explanation of the multi-resolution image data that are used. For the multi-resolution images that are used for this technique for accelerating 3D display process utilizing multi-resolution images, a set of image data with one or more resolutions should be prepared, and the volume of image data should be different. As the simplest example of multi-resolution image data, a plurality of lower resolution images can be created by culling image data uniformly in space from the original image data. Other possibilities are, as explained in Embodiment 2, multi-resolution image data for synthesized images in which the resolution at important local areas is maintained high, and the resolution at other local areas is lowered, or multi-resolution image data for cut images, in which only an important local area is cut from an original image. Thus, there is no limitation to the multi-resolution image data used in the technique for accelerating 3D display process utilizing multi-resolution images in accordance with the present invention.

Regarding the image display process utilizing multi-resolution images, the present invention further discloses the following techniques for accelerating the 3D display process.

Firstly, there is a process for regulating the reading of the multi-resolution image data into the memory.

This process regulates whether the set of multi-resolution image data is read in all at once, or whether, after the displayed resolution has been determined, only the image data with the right resolution is read in from all the multi-resolution images. That is to say, in the process for reading in the multi-resolution image data, it is selected whether the read-in process takes place before the process of creating the displayed images and the entire set of multi-resolution image data is read in from the images to be read in, or whether the read-in process takes place after image data of one resolution have been selected in the process of creating the displayed images, so that only the resolution image data selected from the multi-resolution image data of the images to be read in are read in.

Thus, by allowing the selection of one of these two processes, it is possible to balance the memory capacity against the display speed. If there is sufficient memory that can be utilized for the reading in of the multi-resolution image data, then the former process of reading in the entire set of multi-resolution image data can be selected, and if the memory that can be utilized is not sufficient, then the latter process of reading in the image data with the right resolution should be selected when the resolution to be used has been decided.

Secondly, there is a regulation process by deleting multi-resolution image data that have been read in from memory.

It is possible to regulate also the process of deleting multi-resolution image data that have been read into memory by a reading process.

In the image data deletion process of deleting from memory multi-resolution image data that have become obsolete, it can be selected whether the obsolete image data are deleted when the image data recording capacity has exceeded a capacity set in the memory, or whether the image data of the other resolutions are deleted at the time when the image data of a certain resolution have been selected in the process of creating the displayed images.

Thirdly, during browsing searches, often there is not a lot of time for processing before displaying, but it is possible to subject all of the specimen of a population for which there is the possibility of display to a certain processing beforehand. Since the displayed objects are only a small fraction of the population, the process of reading in the image data can be accelerated before or during the display by structuring the image data all into one file, thus allowing efficient random access.

Fourthly, there is a process of limiting the largest resolution to a specified value. For images used in browsing searches, image data of an excessively high resolution lead to a decrease in the processing speed, so that original images in which the data amount is too large are not used for displaying.

Fifthly, there is a process of omitting the resolution transformation process during display by performing the color rendering on the display and the transformation to depth (data amount per pixel) simultaneously with the resolution transformation. For example, in recent personal computers, it is possible to use 16 bit color rendering (5 bit each for R, G and B). If data with 8 bit each of R, G and B is transformed into 16 bits, it is not only possible to omit the transformation process during display, but a reduction of the data amount and an improvement of the display speed can be expected as well.

The above are techniques for accelerating the 3D display process by utilizing multi-resolution images.

The following is an explanation of a third technique for accelerating the 3D display process in accordance with the present invention.

The third technique for accelerating the 3D display process in accordance with the present invention is a technique for a process of projecting distant images with excessive shrinkage. In accordance with this technique for a process of projecting distant images with excessive shrinkage, in the process of expanding/shrinking the original image data in accordance with the size of the images arranged in virtual 3D space seen from the spatial viewpoint, a shrinking ratio is applied that is larger than the shrinking ratio that is proportional to the distance between the spatial viewpoint and the images, which is determined from the relation between the information about where the images are arranged in virtual 3D space and the information about the spatial viewpoint, and the size of the images is further reduced. That is to say, with this technique, the further away the images are located in the virtual 3D space, the more the shrinking ratio is increased, thus projecting the images with excessive shrinking.

As an example of a process of projecting distant images with excessive shrinkage, it is possible to divide for example by $Z_0^2$ instead of dividing with the coordinate $Z_0$ of the depth of the representative point when calculating the expansion/shrinkage in accordance with the distance between the images and the spatial viewpoint. With this process, the shrinking ratio is set in proportion to the square of the distance, so that images that are far away from the viewpoint are shrunk excessively, and the image writing can be effectively omitted due to the process of omitting small images described below, thus accelerating the display process.

A fourth technique for accelerating the 3D display process in accordance with the present invention is a process of omitting small images. In this process of omitting small images, for the process of writing the image data of all images in the process of creating the displayed images, a threshold is provided regarding the size in the 2D arrangement of the images, and when the size is below this threshold, the writing process of the images themselves is omitted. The projection calculation of the omitted image data is omitted, so that the image processing amount can be reduced, and a high-speed display can be attained.

A fifth technique for accelerating the 3D display process in accordance with the present invention is a process of omitting distant images. In this process of omitting distant images, the writing of images that are further than a certain distance away from the spatial viewpoint in the virtual 3D space is omitted. As an example of a process of omitting distant images, a certain long range threshold is set for the difference between the depth coordinate of the images and the spatial viewpoint, that is, the distance from the spatial viewpoint to the images, and images for which the distance from the spatial viewpoint exceeds this long range threshold are regarded as distant images, and the writing process of these images is omitted. Since the projection calculation for the omitted image data is omitted, the image processing amount can be reduced, and a high-speed display can be attained.

A sixth technique for accelerating the 3D display process in accordance with the present invention is a process of omitting near images. With this process of omitting near images, the display of images that are very near to the spatial viewpoint is omitted. In the task of browsing searches and viewing, one shifts within the virtual 3D space, and for images resulting from a search that are uninteresting, a detailed image display is not carried out, but one may proceed in the depth direction in order to browse other images that are in the depth of the virtual 3D space. For this, the spatial viewpoint passes through the vicinity of images of no interest, so that they become very close and are displayed very large. It is wasteful to display these images of no interest very large during the search, so that the writing of these images may just as well be omitted. Thus, as the process of omitting near images, images that are very near to the spatial viewpoint are regarded as images that are of no interest, and their display is omitted. As an example of a process of omitting near images, a certain close range threshold is set for the distance from the spatial viewpoint to the images, and images for which the distance from the spatial viewpoint is smaller than this close range threshold are regarded as near images, and the writing process of these images is omitted. Since the projection calculation for these image data that are not written is omitted, the image processing amount can be reduced, and a high-speed display can be attained.

A seventh technique for accelerating the 3D display process in accordance with the present invention is an out-of-screen image omission process. In this out-of-screen image omission process, writing is omitted for images of which more than a certain amount is in the periphery and that protrude out of the display area in the image data writing process during the process of creating the displayed images. Here, as an example of the out-of-screen image omission process, a threshold is provided for each direction of the images arranged in the virtual 3D space, and images that are within the thresholds are written into the display image, whereas for images that are outside the thresholds, that is, more than a certain amount is in the periphery, only the frame is written, but the writing process of the image itself is omitted. Here, as an example of the direction of the image, the direction of the center of the image seen from the spatial viewpoint, the direction of the center of gravity weighted with the brightness of the image seen from the spatial viewpoint, or the representative point can be adopted. Methods for judging whether the image direction is outside the set range include the method of judging whether the 2D arrangement position of the representative point of the image is outside a certain range of the display image. Here, in the case of an ordinary CG clipping process, it would be normal that a portion of the image within the display is displayed, but with the out-of-screen image omission process according to the present invention, writing is omitted for the entire image whose writing is omitted. It seems to be more appropriate that images whose representative point cannot be seen during browsing searches or viewing are not displayed. With the out-of-screen image omission process of the present invention, since the projection calculation for the not written image data is omitted, the image processing amount can be reduced, and a high-speed display can be attained.

An eighth technique for accelerating the 3D display process in accordance with the present invention is a process for efficiently determining concealment. In browsing searches and viewing, the image closest to the viewpoint often takes up a very wide display area on the display, so that images located at larger distances may be completely concealed by images located at near distances. In this case, the display can be accelerated by omitting the projection process of images that are completely concealed.

Figure 5:
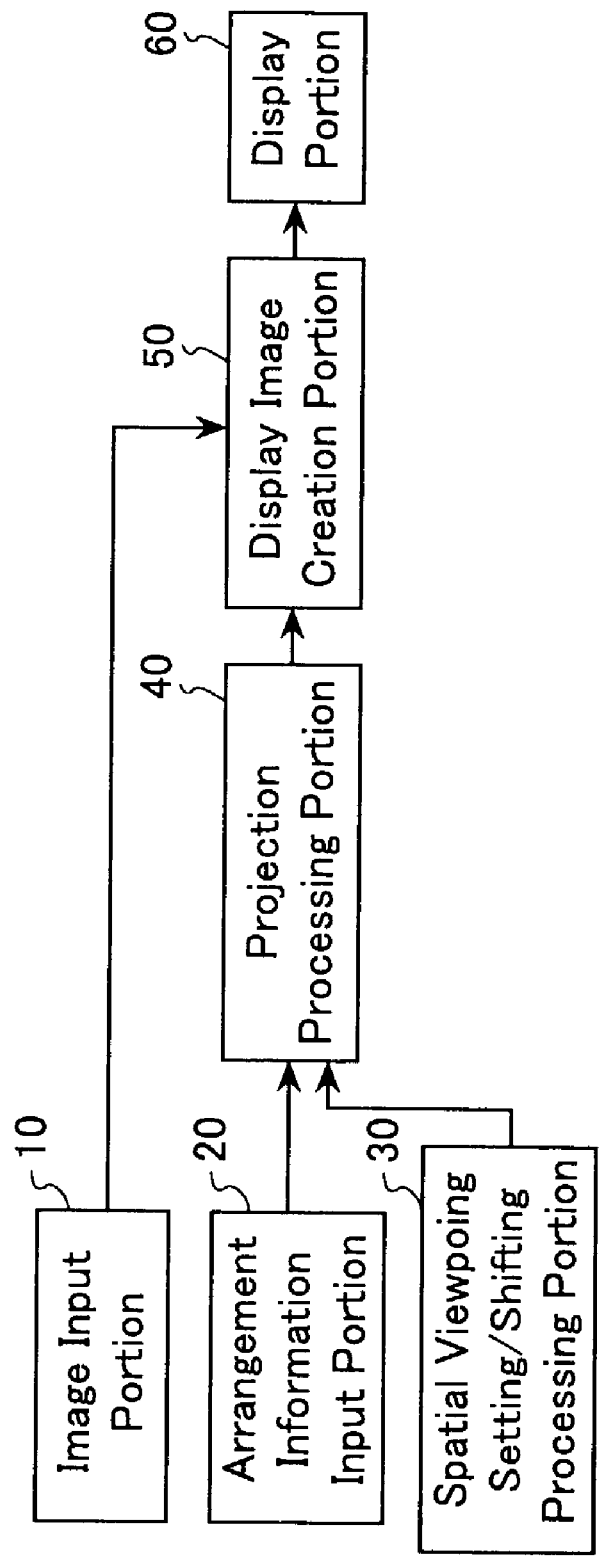
FIG. 5 shows an example of the configuration of a device that employs the techniques for accelerating the 3D display process in accordance with the present invention.

Next, an example of a configuration of a device is illustrated that employs the techniques for accelerating the 3D display process in accordance with the present invention as explained in this Embodiment 1. FIG. 5 shows an example of the configuration of a device that employs the techniques for accelerating the 3D display process in accordance with the present invention. As shown in FIG. 5, the device includes an image input portion 10, an arrangement information input portion 20, a spatial viewpoint setting/shifting processing portion 30, a projection processing portion 40, a display image creation portion 50, and a display portion 60.

Image data are read in with the image input portion 10. Information about the arrangement of the images in the virtual 3D space is read in with the arrangement information input portion 20. With the spatial viewpoint setting/shifting processing portion 30, the setting and shifting of the spatial viewpoint is specified by parameters including the viewpoint location in the virtual 3D space and the direction of the line of sight. The original image data are subjected to a projection process, such as the parallel expansion projection process illustrated in Embodiment 1, based on the relation between the information about the arrangement of the images in the virtual 3D space and the information about the spatial viewpoint, and the simplified 2D arrangement of the images seen from the spatial viewpoint is determined with the projection processing portion 40. Based on the resulting simplified 2D arrangement, the images are written as 2D display images with the display image creation portion 50. The created 2D display images are displayed by the display portion 60.

Thus, with the techniques for accelerating the 3D display process in accordance with the present invention, a large number of images to be searched can be displayed quickly in the virtual 3D space. It should be noted that the techniques for accelerating the 3D display process explained above can be used in any suitable combination.

Embodiment 2

Embodiment 2 is a technique for rendering 3D images that is optimized to the display of a large number of images, which is a second basic technique of the image display method according to the present invention. Image rendering techniques such as a multi-resolution image synthesis display process, a display process cutting out an essential region, a process for displaying a substitute for an omission, a process for limiting the range throughout which the viewpoint can be shifted, a process of highlighting a certain image, a process for displaying coordinate axes or the like, a process for displaying images with frames, and a process of spreading out the arrangement of images will be explained. It should be noted that these can be used in any suitable combination.

The first image rendering technique of the present invention is a technique for rendering 3D images using multi-resolution synthesized images.

In the process for arranging and displaying images in virtual 3D space, multi-resolution image data may be used for high speed processing. For each image, multi-resolution image data are created, in which the image data for a plurality of different resolutions are assembled as one set, and during display, the image of the suitable resolution is selected in accordance with the size, and is displayed.

A display example using multi-resolution images that are simply shrunk in accordance with the image size is shown in FIG. 4. However, using multi-resolution images that are shrunk in accordance with the size of the image, as shown in FIG. 4 makes it difficult to recognize content visually as image data of low resolution are shrunk. Assuming that a large number of images are displayed in the virtual 3D space, many images will be displayed small, so that it becomes difficult to recognize the many images while maintaining perspicuity.

To solve this problem, the present invention presents the following technique for rendering 3D images that is suitable for browsing searches, using multi-resolution synthesized images.

Multi-resolution synthesized images are images, in which a region essential for the user of the search or a region that best represents the content of the image is partially extracted from the original images, and the size of this area is maintained large as a high-resolution image portion, whereas the other portions of the original image are abridged as low-resolution images, and the two portions are synthesized into one synthesized image. The "high resolution," however, does not exceed the resolution of the original image.

The process of creating multi-resolution image data includes a process of dividing the original images into a plurality of partial regions and retrieving only specified partial regions, a process of creating image writing frames adapted to the size of the created images of various resolutions, a process of writing into the corresponding positions of the image writing frames while adapting to the size of the image writing frames and maintaining the size of the retrieved partial regions to the best possible extent, and a process of creating the synthesized image data of one image, omitting the writing of data into the not-yet-written portions of the image writing frames.

Figure 6:
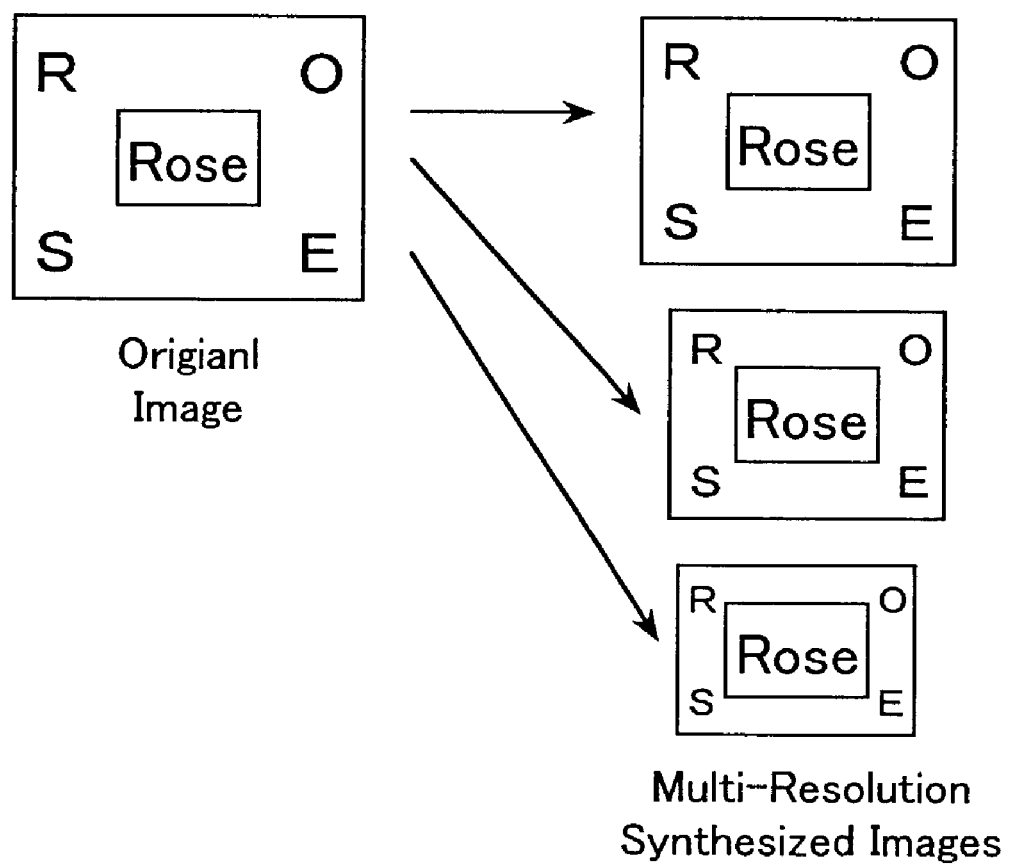
FIG. 6 shows an example of multi-resolution synthesized images created with the process of the present invention.

FIG. 6 shows an example of multi-resolution synthesized images created with this process. As shown in FIG. 6, it is judged that the center portion "rose" of the original image in FIG. 6 is the essential portion, and in the multi-resolution synthesized image, this portion is maintained large. The visual information amount with the multi-resolution synthesized images in FIG. 6 is larger than with the simple shrinking of the image as in FIG. 4, and it can be seen that it is suitable for browsing searches or viewing.

Here, it is necessary to determine which portion of the original image is the region that is essential for the user of the search or the region that best represents the content of the image. As an example of this judgment method, first, it is possible to let someone judge and specify which portions should be rendered with high resolution. Furthermore, as a process for retrieving only the specified regions, for example, it is possible to specify regions of a plurality of regions in the original image, in which the derivative of the image data is larger than a set value. An example of a process for judging the essential portions by differentiating the pixels is shown in the flowchart in FIG. 7.

First, the target region is initialized (Step S701). The current target region is set to the upper left corner of the image. A variable that stores the region in which the differentials are maximal is provided.

Next, the target pixel is initialized (Step S702). The current target pixel is set to the upper left corner of the target region. A variable Sum storing the sum of the differentials is set to 0.

Next, the pixel value is differentiated (Step S703). In the current target pixel, the absolute value (or the square of the sums) of the difference to the values of the pixels above, below, left and right is calculated. This calculation is performed individually for R, G and B. The resulting values are added to Sum.

Next, the target pixels is shifted. Here, the neighboring pixel in the X-axis direction is taken as the next target pixel (Step S704). If the current target pixel exceeds the coordinate of the right edge of the target region (Step S705: Y), then the pixel at the left edge one below in Y-axis direction is taken as the next target pixel (Step S706). If the current target pixel exceeds the coordinates of the right edge and the lower edge of the target region (Step S707: Y), then this means that the differential has been finished for all pixels in the target region, and the procedure advances to Step S708.

If the current target pixel is not at the right edge of the target region (Step S705: N) or the current target pixel is not at the right edge and at the lower edge of the target region (Step S707: N), then the differential of Step S703 is carried out again for the shifted target pixel.

If the target pixel exceeds the coordinate at the lower edge of the target region (Step S707: Y), then the sum Sum of the differentials is compared to a threshold (Step S708). If the sum Sum of the differentials is larger than the threshold, the current target region is stored.

Next, it is determined whether unprocessed target regions are left, and if there are (Step S709: Y), the target region shifts to another region, for example to the neighboring pixel region on the right. If the right edge of the image has been reached, the target region shifts to the pixel region at the left edge one layer below.

To calculate the differentials in the next target region, the procedure returns to Step S702.

If there are no unprocessed target regions left (Step S709: N), then the procedure ends.

Figure 7:
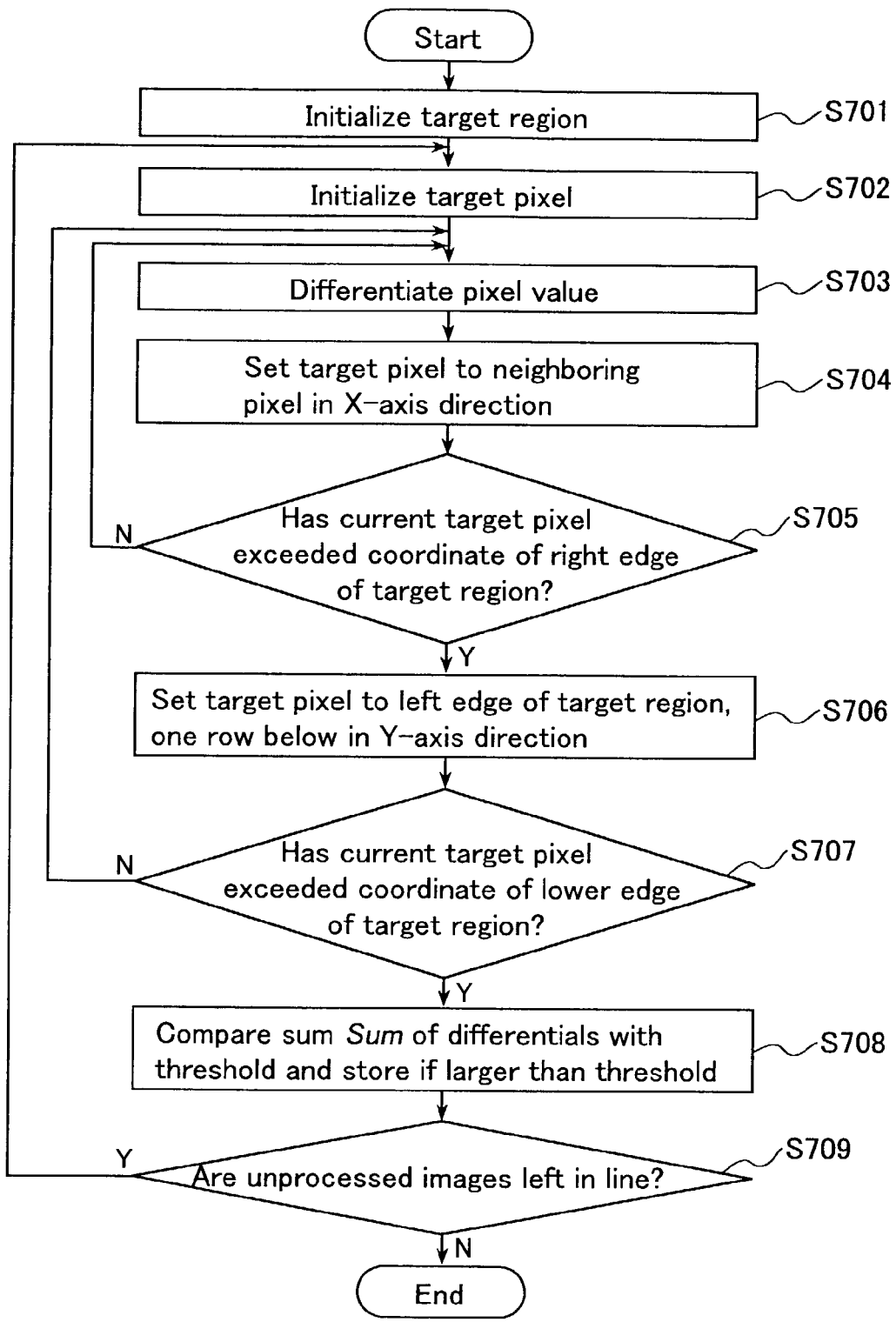
FIG. 7 is a flowchart showing the procedure for the process of judging the essential portions by differential in the multi-resolution image creation process of Embodiment 2 of the present invention.

With the procedure shown in the flowchart of FIG. 7, image regions having a differential larger than a threshold can be specified from among all image regions.

Thus, with a 3D image rendering technique using the multi-resolution synthesized images of the first image rendering technique of the present invention, it is possible to obtain multi-resolution synthesized images with an information amount that is suitable for browsing searches, even when small images with a low resolution are displayed.

A second image rendering technique in accordance with the present invention is a 3D image rendering technique using a display process cutting out an essential region. This display process cutting out an essential region is suitable for browsing searches, just like the above-described display process using multi-resolution synthesized images.

A cut image is an image, in which an original image is cut around a region that is essential for the user of the search or a region best representing the content of the image, with respect to writing frames of the images adapted to the sizes of the created images of various resolutions, and a portion of the original image is cut out with the essential portion at the center.

Figure 8:
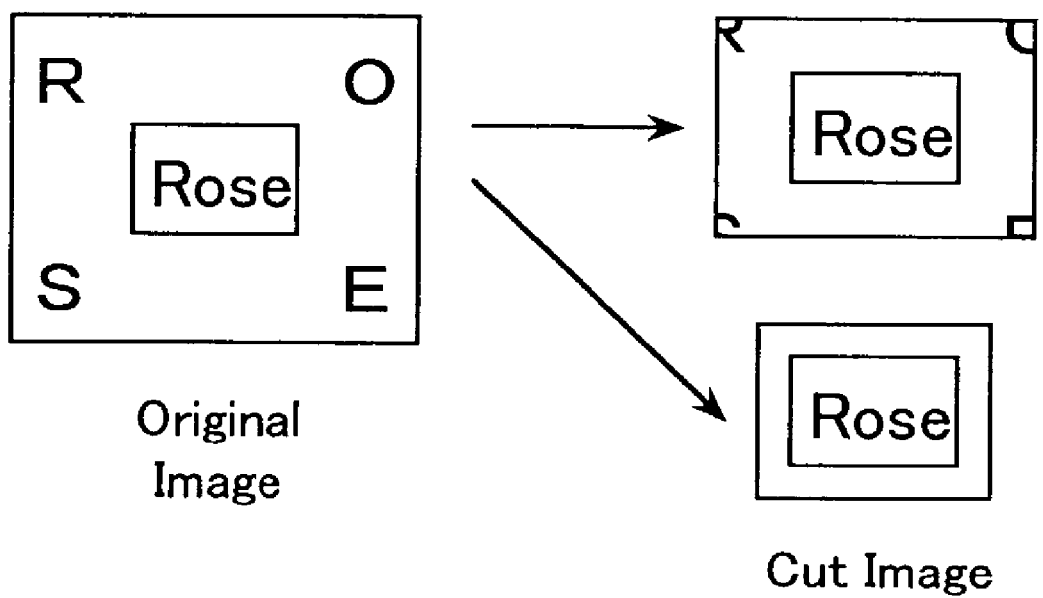
FIG. 8 shows an example of a cut image created by the process of the present invention.

FIG. 8 shows an example of an image created by this process, in which the important portion has been cut out. As shown in FIG. 8, the central portion marked "rose" in the original image is taken as the essential region of the cut image, and is cut to a small image writing frame. The cut image is a partial image of the original, but it can be seen that the essential portion "rose" is shown with high efficiency, so that it is suitable for browsing searches and viewing.

Which portion of the original image is an essential region or a region best representing the content of the image can be determined, for example, by checking for the region in the original image where the differential of the image data is largest, as in the case of the process for creating multi-resolution synthesized images.

A third image rendering technique in accordance with the present invention is a process of a substitute display when image writing is omitted.

When a process of omitting small images or a process of omitting distant images is carried out in the technique for accelerating the 3D display process according to the present invention, then a substitute graphic (for example a white quadrilateral) or a character string of the title of the image replacing the written image, for example, is displayed instead of the entire image or the image portion whose writing has been omitted. If the substitute image that is displayed instead is one with a small amount of data, then the calculation amount for the display process will be small, so that it does not decrease the display processing speed.

With the image rendering technique using this substitution display process, the display processing speed is hardly decreased, and the effect is attained that the arrangement of the images in the virtual 3D space is made easier to grasp.

Next, a fourth image rendering technique in accordance with the present invention is a process for limiting the range throughout which the spatial viewpoint can be shifted.

The process for limiting the range throughout which the spatial viewpoint can be shifted is a process in which the shifting range of the spatial viewpoint, which can be shifted with a pointing device, such as a mouse, is limited beforehand, and when shifting the spatial viewpoint, it stays in this range.

Thus, by limiting the shifting range of the spatial viewpoint, a display that may confuse the user of the browsing search, such as erroneously shifting the spatial viewpoint to a location where no images are arranged, can be prevented.

Next, a fifth image rendering technique in accordance with the present invention is a process of highlighting certain images. For browsing searches and viewing, the display of images in a certain region that is currently being viewed is clearly highlighted. Moreover, it is also possible to tone down the display of images in other regions to lower their noticeability.

Here, the certain image can be an image that is located near the center of the display or an image in the vicinity of a pointer, such as a mouse. These regions are regarded as the images that are currently being focused on. Furthermore, an example of the highlighting process is a process in which the image brightness in a certain region is made brighter, and display is carried out with a brightness that is gradually reduced when moving away from that region. Alternatively, it is also possible to display the images in a certain region sharp, and increasingly blurred when moving away from that region.

Thus, with the image rendering technique due to the process of highlighting a certain image, it is possible to draw attention only to images in the certain region, thus enhancing searching efficiency and visibility.

Figure 9:
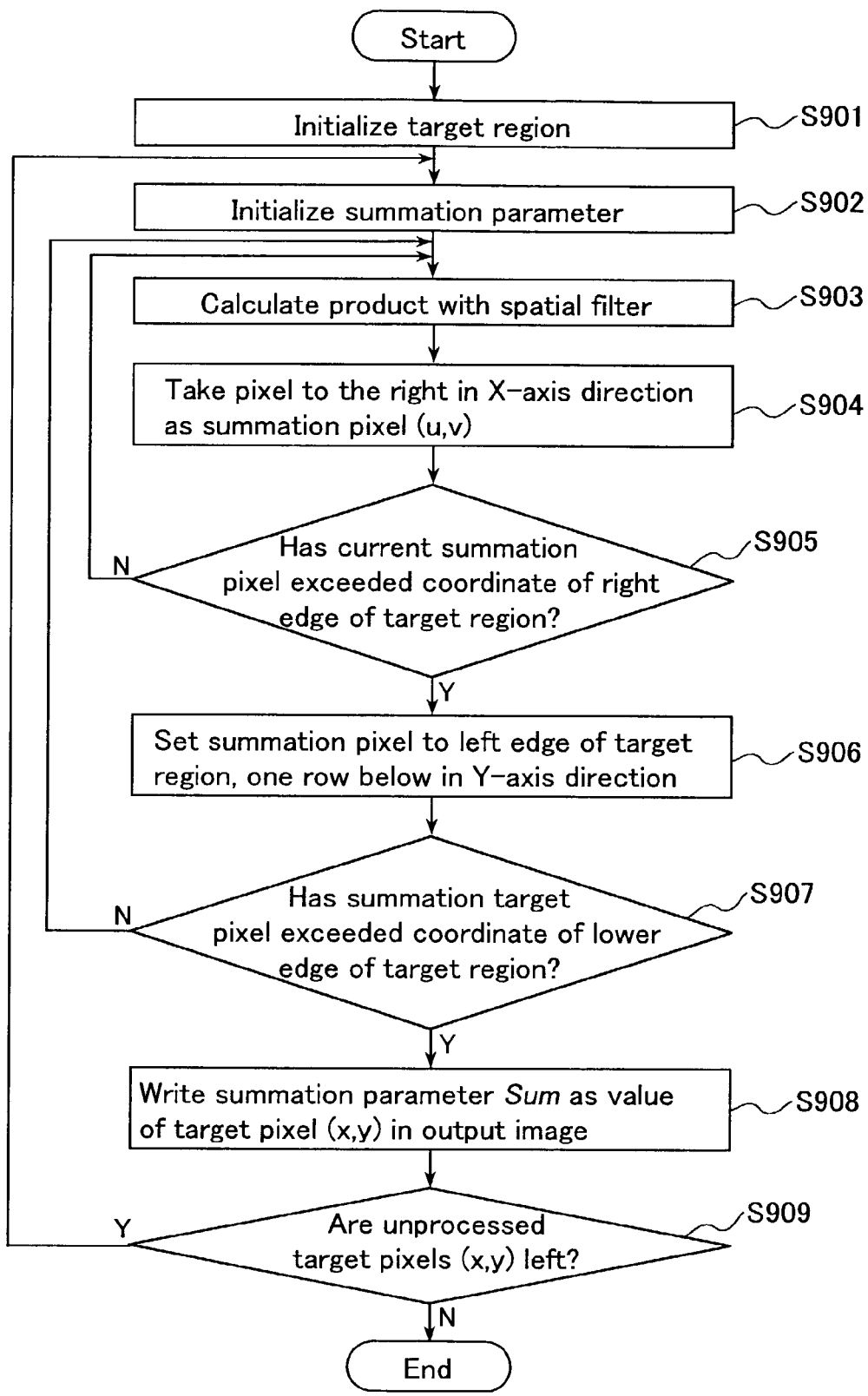
FIG. 9 is a flowchart showing the procedure of the process of blurring images according to Embodiment 2 of the present invention.

Here, an example of the process of blurring images is explained with reference to the flowchart in FIG. 9.

Generally, blurring processes are often carried out by a convolution calculation of the image data with a spatial filter having a spatial constant determined by the blurring degree as a parameter. An example of a spatial filter is for example a Gaussian $f(X, Y)=\exp(\Box(X^2+Y^2)/2\sigma^2)/2\pi\sigma^2$. In this case, $\sigma$ is the spatial constant, and the image is blurred to a texture of that extent. The convolution calculation with the spatial filter and the image data is carried out as follows, for example. The image subjected to the filtering process is represented by an input image I.

First, the target pixel is initialized (Step S901). The target pixel (x, y) is set in the upper left of the image. An output image is provided.

Next, a summation parameter is initialized (Step S902). This summation parameter Sum, which stores the total of the calculation, is initialized by setting it to 0. The pixel (u, v) for which the sum is determined is set to the upper left of the image.

Next, the product with the spatial filter is calculated (Step S903). The product I(u, v) f(u−x, v−y) between the spatial filter and the value of the pixel of the summation pixel parallel shifted by (u, v) is calculated, and added to the summation parameter Sum. This calculation is performed individually for R, G and B.

Next, the summation pixel is shifted. The next summation pixel (u, v) is taken to be one to the right in X-axis direction (Step S904). If the current summation pixel has exceeded the coordinate of the right edge of the target region (Step S905: Y), then the next summation pixel is taken to be the pixel in the target region at the left edge one below in the Y-axis direction (Step S906). If the current summation pixel has reached the right edge and the lower edge (Step S907: Y), then the convolution calculation with the spatial filter and the image data has ended, and the procedure advances to Step S908.

If the summation target pixel has not exceeded the coordinate of the right edge of the target region (Step S905: N) or the current summation pixel has not exceeded the coordinate of the lower edge (Step S907: N), then the product of the shifted summation pixel and the spatial filter is calculated again (Step S903). If the summation pixel (u, v) has exceeded the coordinates of the right edge and the lower edge (Step S907: Y), then the summation parameter Sum is written as the value of the target pixel (x, y) in the output image (Step S908).

Next, it is determined whether unprocessed target pixels (x, y) are left, and if there are (Step S909: Y), (x, y) is shifted by 1 to the right, to shift the target pixel to the next pixel. If the right edge has been reached, the target pixel shifts to the pixel at the left edge one row below. The procedure then returns to Step S901 to perform the summation again.

If there are no unprocessed target pixels (x, y) left (Step S909: N), the procedure ends.

The above is an example for the procedure of the blurring process.

It should be noted that it is possible to change the spatial constant a depending on the target pixel, and that it is possible to perform a highlighting process of a certain image.

A fifth image rendering technique in accordance with the present invention is a process for displaying coordinate axes or the like.

If images arranged in the virtual 3D space are displayed, it becomes easier for the user to grasp the virtual 3D space when 3D objects separate from the images, such as coordinate axes, are displayed. In particular when using a process of creating the displayed images using a simplified 2D arrangement with the parallel expansion projection of the present invention, this is an effective image rendering technique for making the virtual 3D space easier to grasp. In order to highlight the coordinate axes, it is possible to mark the coordinate axes with a highlighting color. Furthermore, it is also possible to change the color of the coordinate axes depending on the depth in the virtual 3D space. Changing the color of the coordinate axes in this manner makes easier to grasp the depth of the virtual 3D space.

A sixth image rendering technique in accordance with the present invention is a process for displaying images with frames.

This process for displaying images with frames is an image rendering process that adds a frame of a certain width (it is also possible to change the size depending on the distance) to each image when displaying images arranged in the virtual 3D space. Here, it is further possible to change the color of the image frame in order to highlight image frames. Moreover, it is also possible to change the color of the image frame in accordance with the depth in the virtual 3D space, in order to make it easier to grasp the depth in the virtual 3D space.

A seventh image rendering technique in accordance with the present invention is a process of spreading out the arrangement of images.

This process of spreading out the arrangement of images is a process of correctively shifting the X and Y coordinates of the images in a direction away from the center of the display, in accordance with the distance from the spatial viewpoint. That is to say, the overlapping of images that are located overlappingly near the center of the display is resolved, and the images are spread vertically and sideways, making them easier to see.

Figure 10:
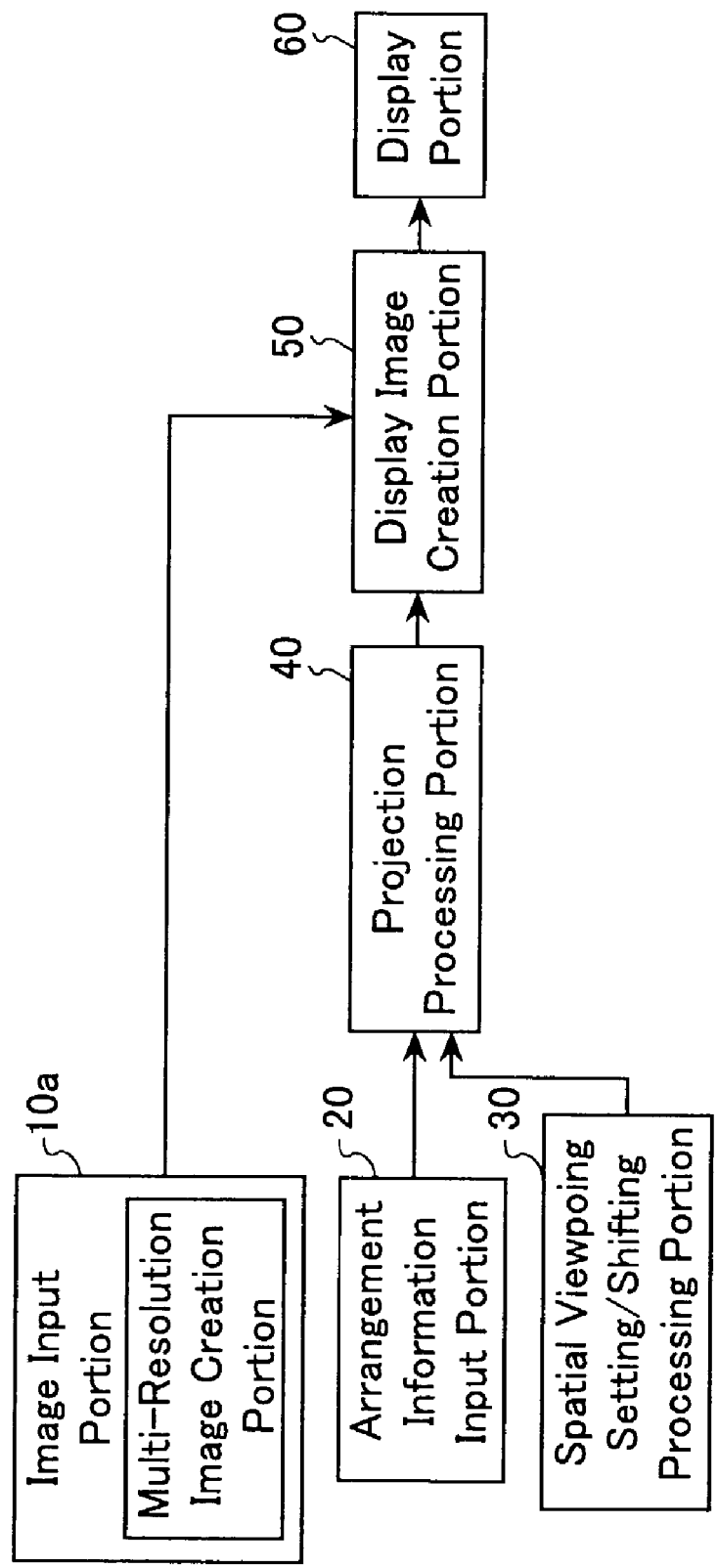
FIG. 10 shows an example of a configuration of a device employing the 3D image rendering techniques of Embodiment 2 of the present invention.

Next, an example of a configuration of a device employing the 3D image rendering techniques of the present invention as explained in Embodiment 2 is shown. FIG. 10 shows an example of a configuration of a device employing the 3D image rendering techniques of the present invention. As shown in FIG. 10, the device includes an image input portion 10*a*, an arrangement information input portion 20, a spatial viewpoint setting/shifting processing portion 30, a projection processing portion 40, a display image creation portion 50, and a display portion 60. The image input portion 10*a* further includes a multi-resolution image creation portion 11.

In this Embodiment 2, image data are read in with the image input portion 10, and multi-resolution images are created by the multi-resolution image creation portion 11. It is, of course, also possible to read in sets of multi-resolution images created externally. Information about the arrangement of the images in the virtual 3D space is read in with the arrangement information input portion 20. With the spatial viewpoint setting/shifting processing portion 30, the setting and shifting of the spatial viewpoint is specified by parameters including the viewpoint location in the virtual 3D space and the direction of the line of sight. Performing a projection process based on the relation between the information about the arrangement of the images in the virtual 3D space and the information about the spatial viewpoint, the 2D arrangement of the images seen from the spatial viewpoint is determined with the projection processing portion 40.

In accordance with the 2D arrangement, the display image creation portion 50 selects images of a suitable resolution and writes them into the display images. Furthermore, they are written into the display images using the various 3D image rendering techniques explained in Embodiment 2 above, such as multi-resolution synthesized images and cut images. The created display images are displayed by the display processing portion 60.

Thus, with the techniques for 3D image rendering in accordance with the present invention, it is possible to perform image rendering that is suitable for the display of a large number of images in a virtual 3D space. It should be noted that the techniques for 3D image rendering explained above can be used in any suitable combination.

Embodiment 3

The third basic technique is a 3D space rendering technique using a background image. This 3D space rendering technique using a background image is a technique showing, with a background image, a background object that serves as a guide for grasping the spatial position in the virtual 3D space in which the images are arranged.

When many images are arranged and displayed in the virtual 3D space, then there is the disadvantage that it is difficult to grasp the 3D space when there is no background, and the background is white or black. In order to solve this problem, a familiar scene, such as the own office or room is captured, and used as the background during display. With the familiar scene as the clue, the position of the images can be grasped, so that it becomes easier to understand what is located where. Thus, browsing searches and viewing can be performed as if everything is arranged around the table in one's own room. With regard to making things easy to remember, it seems to be preferable that the user himself decides on the arrangement.

A technique that is known as a method for obtaining a background image taken as the background is to capture the scene several times while rotating the camera, and to paste these images together to produce a panorama image. By cutting and displaying on a display a portion of the panorama image by operation with the mouse or the like, it is possible to achieve the effect of a round-view of the scene.

It should be noted that it is also possible to make the settings such that certain functions correspond to certain locations on the panorama image. For example, it is possible to make the settings such that when clicking a corresponding location on the panorama image, a certain operation (i.e. execution of a command such as the display of a different panorama image or the sending of mail) is carried out.

The following procedure is disclosed as a 3D rendering technique using a background image.

Firstly, the user carries out the arranging of the images in the virtual 3D space. This increases the ease with which the locations at which the images are arranged can be remembered, and makes it easier to establish a correspondence between the shot image to be taken as the background and the various images.

Secondly, based on the video images capturing the scene, the scene is turned into 3D. For the technique for 3D display of the objects from the shot images, it is possible to use any of the techniques known in the art. With this process, the production of the panorama image can be automated.

Thirdly, the scene that has been captured is limited to a specific environment (for example, the office), and a lexicon storing information regarding objects in this specific environment is utilized. By limiting the specific environment, the background objects appearing in the scene are limited, so that it is possible to prepare a lexicon having information regarding the objects in the specific environment. This lexicon is prepared to hold a large amount of pictures shot of the objects in the certain environment or CG data thereof.

When the spatial viewpoint is shifted or when a close-up is necessary for a restriction of the browsing search, the image data in the lexicon can be used for image display processing.

Fourthly, when creating the panorama image from the images that have been shot, the shot images are pasted onto a known shape, such as a sphere or a cylinder. By using such as known shape, the process of pasting the shot images is simplified, making the creation of the panorama image simpler.

Figure 11:
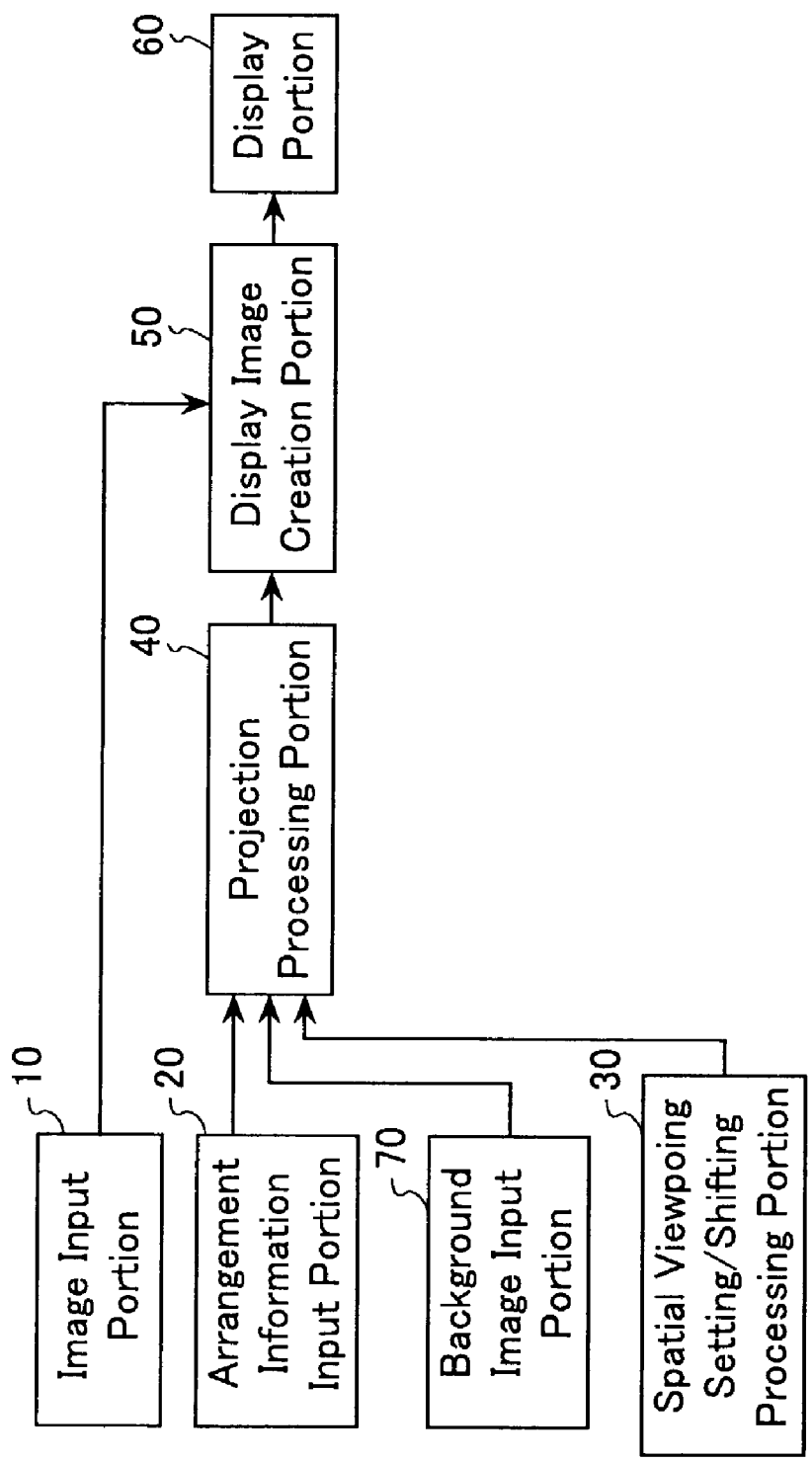
FIG. 11 shows an example of the configuration of a device that employs the 3D space rendering technique using a background image in accordance with Embodiment 3 of the present invention.

Next, an example of a configuration of a device is illustrated that employs the 3D space rendering technique using a background image in accordance with the present invention as explained in this Embodiment 3. FIG. 11 shows an example of the configuration of a device that employs the 3D space rendering technique using a background image in accordance with the present invention. As shown in FIG. 11, the device includes an image input portion 10, an arrangement information input portion 20, a background image input portion 70, a spatial viewpoint setting/shifting processing portion 30, a projection processing portion 40, a display image creation portion 50, and a display portion 60.

Image data are read in with the image input portion 10. Information about the arrangement of the images in the virtual 3D space is read in with the arrangement information input portion 20. The image data of the background image that exists virtually as the background of the virtual 3D space is read in with the background image input portion 70. With the spatial viewpoint setting/shifting processing portion 30, the setting and shifting of the spatial viewpoint is specified by parameters including the viewpoint location in the virtual 3D space and the direction of the line of sight. Carrying out a projection process with the projection processing means 40 based on the relation between the arrangement information of the images and the background image in the virtual 3D space and the spatial viewpoint information, the 2D arrangement of the images and the background image seen from the spatial viewpoint is determined. The read-in image data and background image data are processed with the display image creation portion 50 in accordance with the 2D arrangement of the images and the background image, and 2D display images are created. The created 2D display images are displayed by the display portion 60.

Thus, with the 3D space rendering technique using a background image in accordance with the present invention, the position of the images in the virtual 3D space can be rendered in an easy to understand manner. It should be noted that the 3D image rendering techniques explained above can be used in any suitable combination.

Embodiment 4

The fourth basic technique is a shifting parameter optimization process technique. This technique suppresses strain on the eyes by optimizing the shifting parameters based on the optical flow.

When images are displayed on a display, the display content is often shifted or altered due to user operations such as zooming or scrolling. A problem that occurs in this situation is that of strain on the eyes when the shifting parameters, such as the shifting speed of the display content, are inappropriate. The present technique suppresses strain on the eyes by optimizing the shifting parameters. This technique can be used independently from the techniques for accelerating the 3D display process of a large number of images, the 3D image rendering techniques, or the technique for 3D space rendering using a background image, and can be applied to any kind of image display that involves movements such as zooming or scrolling.

Figure 12:
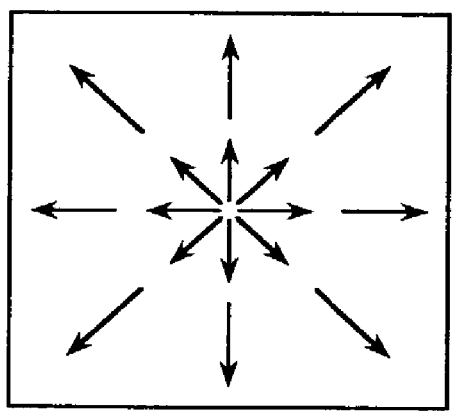
FIG. 12 illustrates how the pixel values of the pixels on the display are shifted by zooming and scrolling.
Figure 12:
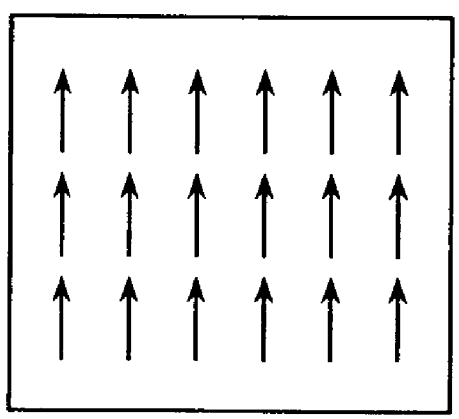

Zooming and scrolling can be expressed by shifting the pixel values for the pixels on the display. This is illustrated in FIG. 12. Also other shifting methods for 3D display can be expressed by shifting the pixel value of the pixels basically in this manner. It appears to be possible to reduce eye strain by correcting how the pixel values are shifted.

Figure 13:
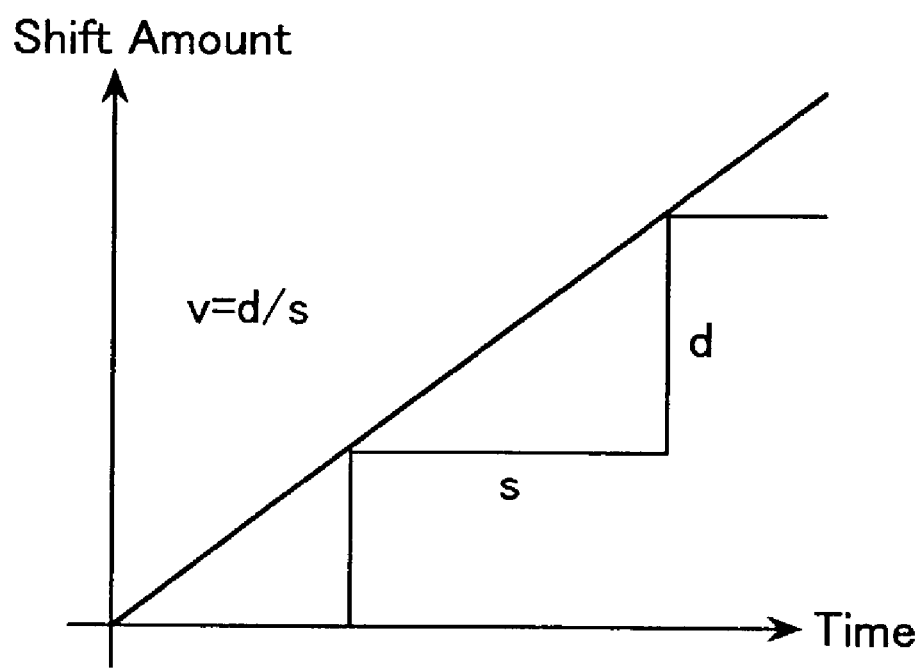
FIG. 13 illustrates the trajectory drawn on the display when focusing on one point of the display content.

First, the strain on the eyes is modeled such that it can be dealt with on a computer. In ordinary display devices for computers or the like, display frames are rewritten one by one in both interlaced and non-interlaced displays. The display content is not continuously changed without rewriting, but is updated at constant time intervals. As shown in FIG. 13, when focusing on just one point of the display content, this point describes a trajectory on the display as shown in FIG. 13.

Figure 14:
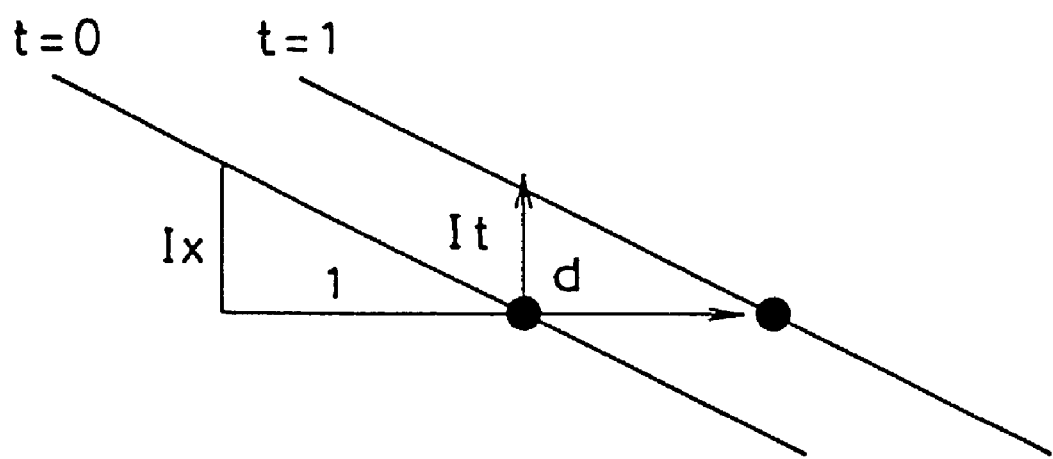
FIG. 14 illustrates the concept of optical flow.

The human eye perceives 3D objects by projection onto a two-dimensional retina. Moving objects cause a smooth change in the brightness distribution on the retina. From the ratio between the temporal change and the spatial change of the brightness distribution, it is possible to determine the movement (referred to as "optical flow" in the following) of the image projected onto the projection screen. FIG. 14 illustrates the concept of optical flow. Under the assumption that one image that is bright on the left side and dark on the right side moves to the right on the display, the spatial change $I_x$ of the brightness distribution takes on a negative value. On the other hand, the temporal change $I_t$ of the brightness distribution and the shifting amount d per unit time take on positive values, and the two are linked by the relation $\Box I_x = I_t/d$. That is to say, it resembles the triangular shape shown in FIG. 13. Here, d is defined as the optical flow. For the calculation of this optical flow d, the brightness distribution over the shifting width may sometimes be regarded as a linear relation. Consequently, the shifting width needs to be sufficiently small. As the shifting width becomes larger, the deviation to the actual movement becomes large. It appears that when the process of blurring the projection image is performed before the brightness change is actually determined, the projected image is not affected by tiny changes of the brightness distribution.

It appears that the human eye causes a movement of the eyeball based on this optical flow, following the object. Thanks to this movement, it is still possible to read the text in a book even when the book is slightly moved. It should be noted that in this section, the model for determining the optical flow is explained only for the brightness (average or maximum of RGB values) and not for the other pixel values, but it is also possible to use a model, in which R, G and B are determined separately and the average is taken. Moreover, several improvements can be applied to the calculation of the optical flow, and the present invention is not limited by the method for calculating the optical flow.

On the other hand, when two objects of similar shape are viewed alternately at a small distance apart, then this is perceived as if one object moves. For example, the blinking of the lamps at a railway crossing looks as if the light is moving. In this case, the optical flow cannot be determined (is non-existent), but it seems that a movement is perceived by taking the correspondence of the places of similar shapes. It is believed that the human eye perceives movements by these two methods. This is the same when displaying on a display. It seems that if the shifting width for one rendering is small enough, then a movement is perceived by determining the optical flow. As the movement becomes large, the optical flow becomes difficult to determine, and the values calculated from the brightness change deviate from the actual movement. Roughly the size of the basic unit of the display content (one character in the case of text; a line width or a constituent graphic shape in the case of a picture) can be regarded as an upper limit of the shifting width for which the optical flow can be determined, although this depends on the complexity of the displayed objects. If the calculated movement is different from the actual movement, then it is necessary to correct the visual position by establishing a correspondence with the shape after moving the eyeball to follow the visual trajectory of the object. In the technique for optimizing the shifting parameter in accordance with the present invention, it is assumed that this correction of the visual position is the cause for eyestrain.

In accordance with these considerations, the extent of the eyestrain is defined as:

extent of eyestrain=number of times an image is rendered× deviation of the optical flow at the focused point (Eq. 1)

Figure 15:
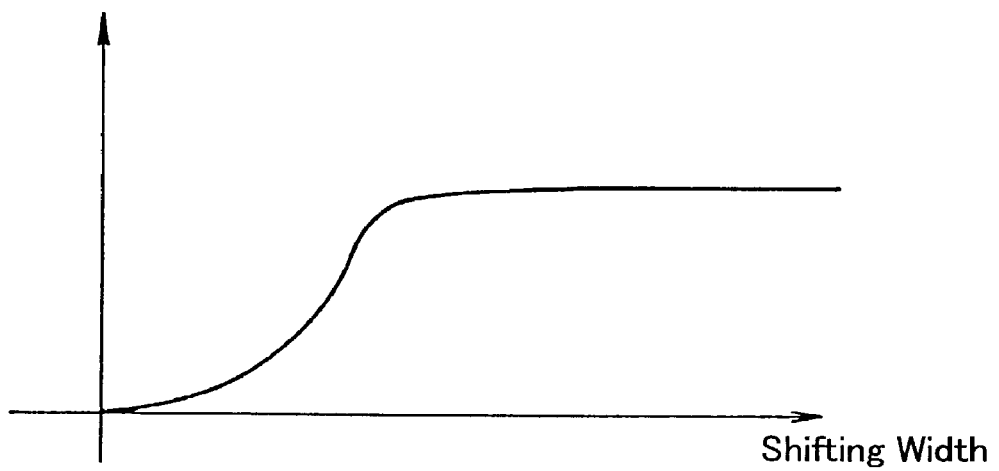
FIG. 15 is a graph illustrating the relation between the deviation of the optical flow and the shifting width per rendered image.

However, the focused point is not necessarily determined, and if no focused point is singled out, then an approximation is performed to the vicinity of the center of the display or the deviation from the average value of the optical flow on the entire display. Furthermore, it is also effective to use the average value of the optical flow in a region in which the shifting speed is comparatively large. It should be noted that when the shifting width is large and the optical flow cannot be determined, then the deviation of the optical flow should be taken to be a preset maximum value. Consequently, the relation between the deviation of the optical flow and the shifting width for one rendered image is as shown in FIG. 15.

As shown in FIG. 13, when one point of the displayed image is fixed, the number of rendered images per unit time at this point is taken to be n=1/s (where s is the time interval between rendered images), and v is image speed, and the shifting speed d that becomes the optical flow for one rendered image can be expressed by d=v/n. As shown in FIG. 15, it appears that the deviation of the shifting width d is proportional to $d^2$ for small shifting widths d, so that the extent of the eyestrain per unit time is proportional to $nd^2$. Since $v^2/n=vd$, in order to reduce the extent of the eyestrain, it is necessary to either increase the number of rendered images when the shifting speed is constant or to reduce the shifting speed or the shifting width. On the other hand, if the shifting width d is very large, the deviation of the optical flow becomes substantially constant, so that the extent of the eyestrain becomes smaller when the number of rendered images is smaller.

On the other hand, the area that is newly presented per unit time ("information amount" in the following) is proportional to the shifting speed v. This is equal to nd. Consequently, when the number of rendered images or the shifting width is reduced, the amount of information that can be presented decreases. The extent of the eyestrain and the amount of information are thus in a trade-off relation. In order to evaluate the optimal shifting parameters, the evaluation function shown in Equation 2 is introduced. If the shifting speed or the shifting width for one shift can be altered while shifting the displayed images, then the optimal shifting can be determined by setting a value that minimizes this evaluation function.

inappropriateness of the display=extent of eyestrain−information amount (Eq. 2)

The following is a list of simple properties of the "inappropriateness of the display" defined in Equation 2.

A first property is that when the shifting speed v is constant, the information amount is constant as well, so that an appropriate display reduces the extent of the eyestrain. Thus, if the shifting width d is small, the shifting width d is made even smaller, and if the shifting width d is large, the shifting width d is made even larger.

A second property is that when the number of rendered images n is constant, and the shifting width d is small, then a minimization of the form $nd^2$□nd is performed, making it possible to determine an optimum shifting width d. And when the shifting width d is large, it should be as large as possible.

Besides adjusting the shifting speed v and the shifting width d, which are shifting parameters, it is also possible to alter the display content itself, to perform an optimum display not causing eyestrain. For this case, the following evaluation function of Equation 3 is introduced, and the display content is changed such that this function is minimized, such that there is almost no divergence from the original display content.

inappropriateness of the display=difference to the original display content+extent of eyestrain−information amount (Eq. 3)

As a measure for the difference to the original display content, the squared average of the brightness difference of each pixel is used, for example. The evaluation function in Equation 3 can also be used when only the display content is altered, and neither the shifting speed v nor the shifting width dare changed.

An example of a process for performing an optimum display without eyestrain by changing the display content is explained with reference to the flowchart in FIG. 16.

First, the variables storing the display content and the shifting parameters are initialized (Step S1601). A region is prepared that stores the previous and the current display content as well as the shifting parameters for each point.

Next, the shifting parameters are read in (Step S1602). If the shifting parameters for each point are specified, then these specified shifting parameters are read in. If they are not specified, then the previous shifting parameters are set.

Next, the display content is read in (Step S1603). If the current display content is specified, then this specified display content is read in. If it is not specified, then display content is shifted in accordance with the previous display content and shifting parameters.

Next, the optical flow is calculated (Step S1604). The optical flow is calculated from the previous display content and the current display content. If necessary, the images are blurred as a pretreatment.

Next, the value of the evaluation function expressing the inappropriateness of the display according to Equation 3 is calculated from the calculated optical flow of the evaluation function and the display parameters (Step S1605).

Next, the value of the evaluation function is evaluated. If the value of the evaluation function is sufficiently small, for example if it is below a preset threshold (Step S1606: Y), then the display is taken to be not inappropriate, and the changed display content that is currently being processed is displayed on the display. Then the procedure advances to Step S1609.

If that is not so (Step S1606: N), the shifting parameters that have been read in are altered (Step S1607). If a change of the shifting parameters is possible, the shifting parameter for each point is changed slightly. The amount of change is increased or decreased by a predetermined size.

Next, the display content is changed in accordance with the altered shifting parameters (Step S1608). If the shifting parameters have been altered, the display content is shifted accordingly. It should be noted that if the display content can be changed, the brightness of each pixel is changed slightly, so that the display content is shifted. This change is increased or decreased by a predetermined size, for example. Then, the optical flow is calculated again (Step S1604).

If the display process is continued (Step S1609: Y), then the procedure returns to Step S1602, the process from Step S1602 to Step S1608 is repeated, and the optical flow is calculated again. If the display process is not continued (Step S1609: N), the process ends.

Figure 16:
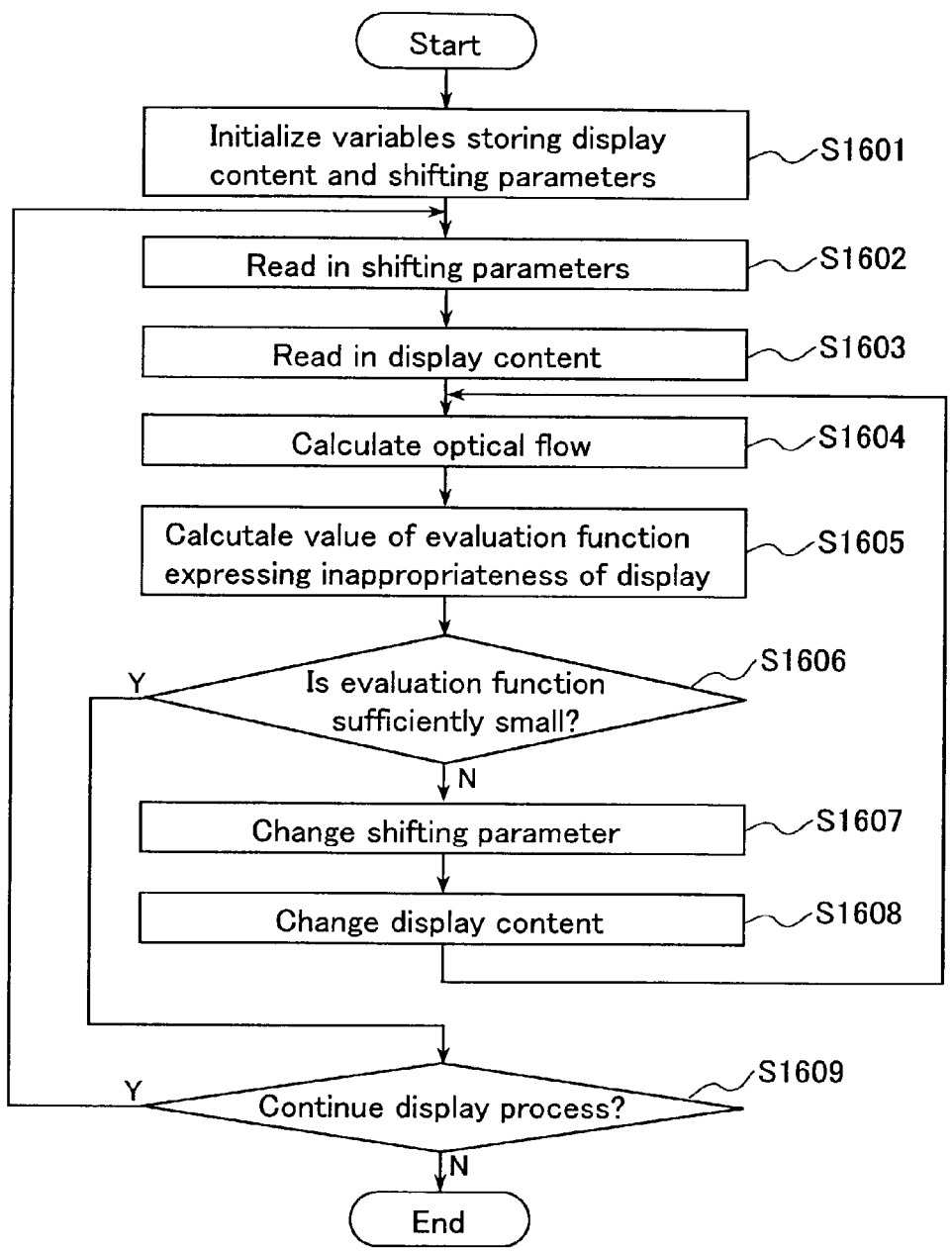
FIG. 16 is a flowchart illustrating the procedure of the process for performing an optimum display without eyestrain by changing the display content.
Figure 17:
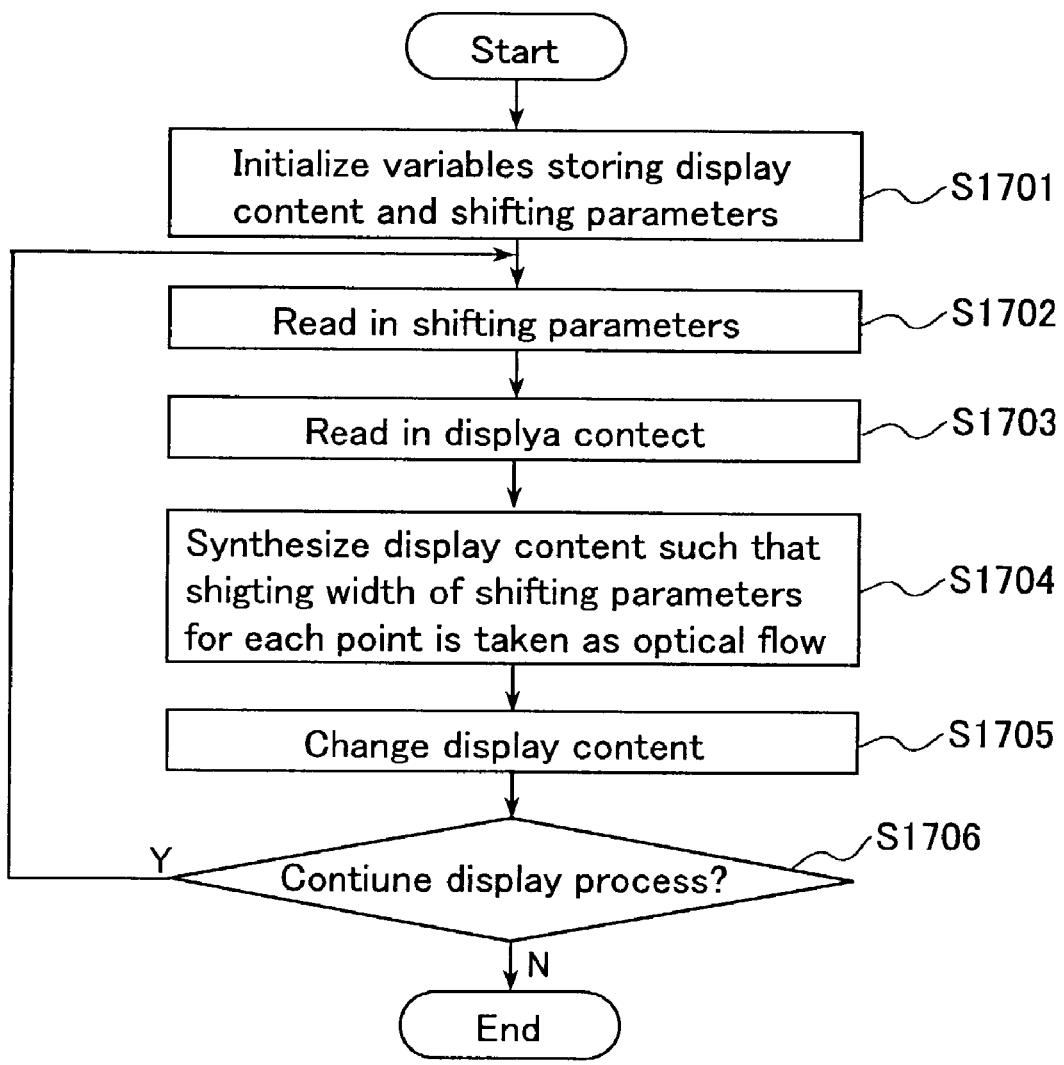
FIG. 17 is a flowchart illustrating the procedure of the process for correcting the display content somewhat without changing the shifting parameter.

It should be noted that the process shown in FIG. 16 takes a relatively long time, so that as a simpler process, it is also possible to adopt the process shown in the flowchart in FIG. 17, which merely corrects the display content somewhat without altering the shifting parameters.

First, the variables storing the display content and the shifting parameters are initialized (Step S1701). A region is prepared that stores the previous and the current display content as well as the shifting parameters for each point.

Next, the shifting parameters are read in (Step S1702). If the shifting parameters for each point are specified, then these specified shifting parameters are read in. If they are not specified, then the previous shifting parameters are set.

Next, the display content is read in (Step S1703). If the current display content is specified, then this specified display content is read in. If it is not specified, then display content is shifted in accordance with the previous display content and shifting parameters.

Next, the display content is synthesized (Step S1704). The display content is synthesized such that the shifting width for each point of the shifting parameters is taken as the optical flow. For example, instead of determining the optical flow from the brightness distribution, it is also possible to realize this by changing from a spatial conversion of the optical flow and the brightness distribution to temporally determining the brightness distribution.

Next, the display content is corrected (Step S1705). The current display content is corrected based on the display content synthesized in Step S1704. For example, the average of both is used. The corrected display content is displayed on the display.

If the display is continued (Step S1706: Y), then the procedure returns to Step S1702, the process from Step S1702 to Step S1705 is repeated, and the optical flow is calculated again. If the display process is not continued (Step S1706: N), the process ends.

The foregoing is the procedure of a process performing optimum display without eyestrain.

Here, it is necessary to determine prior to the calculation of the optical flow to which extent the images are blurred. The process of blurring the images can be achieved by a convolution with a spatial filter that has a spatial constant determining the extent of the blurring as a parameter An example of a spatial filter is for example a Gaussian. The spatial constant of the filter blurring the images can be determined for example in the following manners.

A first approach is to use a specified value. This value can also be adjusted in accordance with the size of the displayed images.

A second approach is to use the value of a basic unit in the image (for example the height of a character), when it is judged that the displayed object has a structure, like a text image. If the height of the characters has not been specified, then the height of the characters are estimated based on an image process. To achieve the estimation of the height of the characters, it is possible to prepare a one-dimensional histogram by adding the brightness in horizontal direction, and to determine the period of the histogram, for example.

Figure 18:
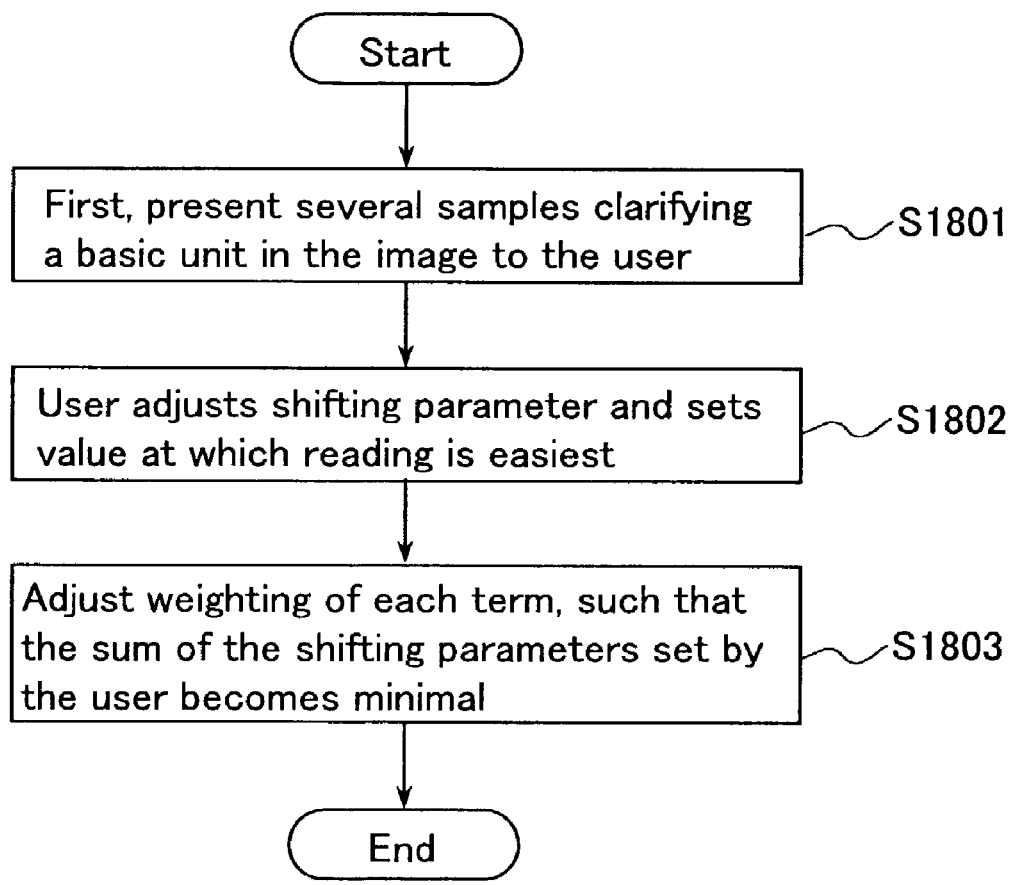
FIG. 18 is a flowchart illustrating the procedure of the process for setting the weights added to each item of the evaluation function in consideration of individual differences.

The above-described model does not take individual differences into consideration, but it is possible to account for individual differences by adding weights to each term (difference to the original display content, eye strain, information amount) of the evaluation function. This can be done for example with the process illustrated in the flowchart in FIG. 18.

First, several samples clarifying the basic units in the images are presented to the user (Step S1801).

Then, the user adjusts the shifting parameters and sets them to the values at which reading becomes easiest (Step S1802). A method that is possible as this method of adjusting/setting the shifting parameters is to perform a reading test (or a reading game) that is carried out for several shifting parameters serving as samples, and to determine the shifting parameters from the ratio of correct answers. For example, it is possible to set the shifting parameters to the parameters at which the ratio of correct answers starts to deteriorate.

Next, the various terms of the evaluation function are calculated individually for each shifting parameter, and the weighting of the terms is adjusted such that the sum is minimized by the shifting parameter values set by the user (Step S1803).

With this process, individual differences can be taken into account, and the weighting applied to various terms of the evaluation function can be changed.

Figure 19:
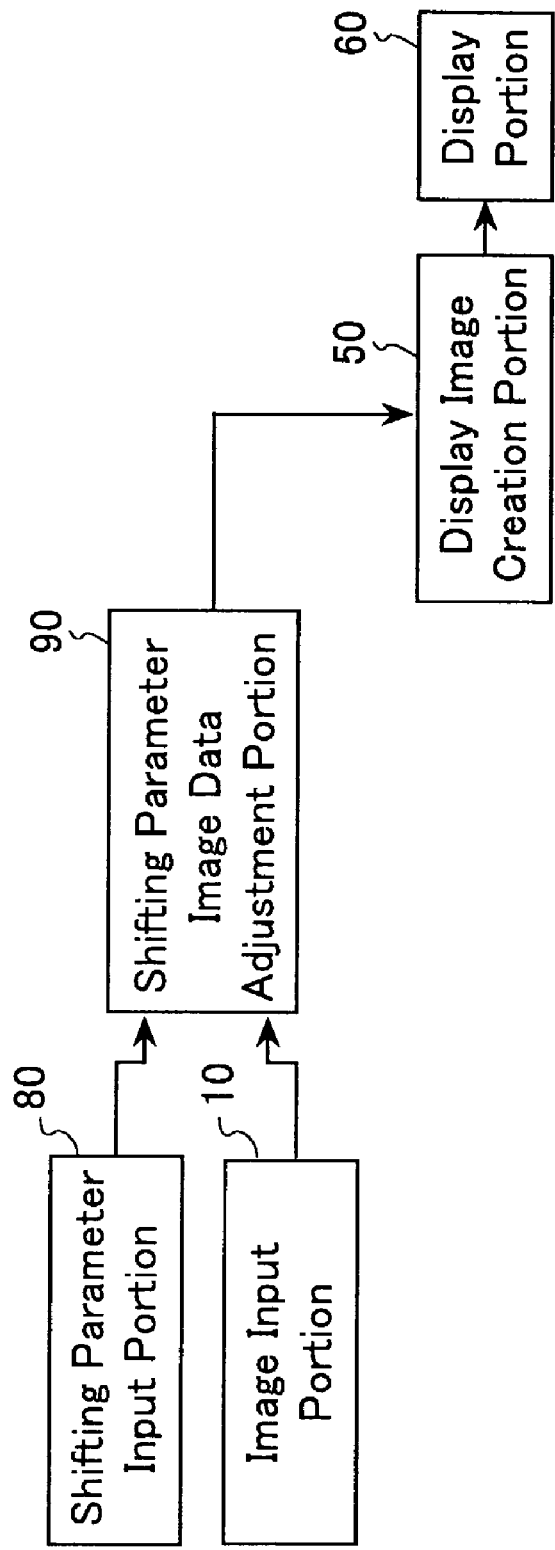
FIG. 19 shows an example of a configuration of a device employing the process technique for optimizing the shifting parameter in accordance with Embodiment 4 of the present invention.

Next, an example of a configuration of a device is illustrated that employs the shifting parameter optimization process of the present invention explained in Embodiment 4. FIG. 19 shows an example of the configuration of a device that employs the 3D display processing acceleration techniques in accordance with the present invention. As shown in FIG. 19, the device includes an image input portion 10, a shifting parameter input portion 80, a shifting parameter/image data adjustment processing portion 90, a display image creation portion 50, and a display portion 60.

Image data are read in with the image input portion 10. The shifting parameter specifying how the images are shifted is read in with the shifting parameter input portion 80. The shifting parameter/image data adjustment processing portion 90 reduces the viewpoint shifting deviation, which is the difference between the optical flow and the actual movement of the pixels of the various images, based on the read-in image data and shifting parameter, and adjusts at least one of the shifting parameter and the image data such that the shifting amount of images between frames that are adjacent in time is increased. It is possible to adjust only the shifting parameter, to adjust only the image data, or to adjust both the shifting parameter and the image data. The read-in image data are processed in accordance shifting parameter or image data adjusted with the display image creation portion 50, and 2D display images are created. The created 2D display images are displayed by the display portion 60.

The following is an explanation of an example of the case that the shifting parameter optimization process technique is applied to the image display of images arranged in the 3D virtual space.

Figure 20:
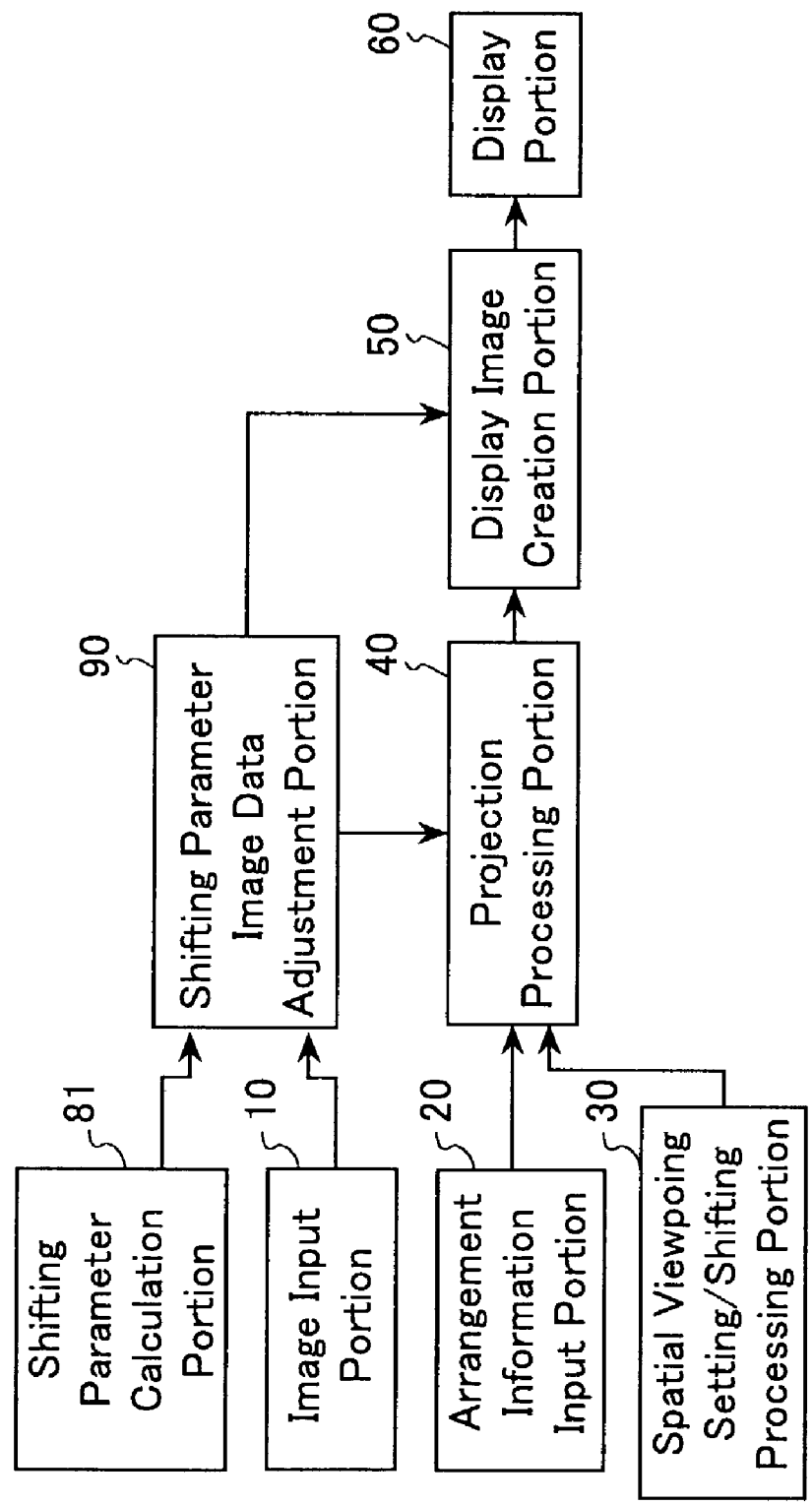
FIG. 20 shows an example of a configuration of a device in which the process technique for optimizing the shifting parameter in accordance with the present invention is employed for the image display of the virtual 3D space.

FIG. 20 shows an example of the configuration of a device that applies the shifting parameter optimization process technique of the present invention to the image display of images arranged in the 3D virtual space of the present invention. As shown in FIG. 20, the device includes an image input portion 10, an arrangement information input portion 20 a shifting parameter calculation portion 81, a spatial viewpoint setting/shifting processing portion 30, shifting parameter/image data adjustment processing portion 90, a projection processing portion 40, a display image creation portion 50, and a display portion 60.

Image data are read in with the image input portion 10. Information about the arrangement of the images in the virtual 3D space is read in with the arrangement information input portion 20. With the spatial viewpoint setting/shifting processing portion 30, the setting and shifting of the spatial viewpoint is specified by parameters including the viewpoint location in the virtual 3D space and the direction of the line of sight. The shifting parameter calculation portion 81 calculates the shifting parameter specifying how the images are shifted. The shifting parameter/image data adjustment processing portion 90 reduces the viewpoint shifting deviation, which is the difference between the optical flow and the actual movement of the pixels of the various images, based on the read-in image data and shifting parameter, and adjusts at least one of the shifting parameter and the image data such that the shifting amount of images between frames that are adjacent in time is increased. It is possible to adjust only the shifting parameter, to adjust only the image data, or to adjust both the shifting parameter and the image data. The 2D arrangement of the images seen from the spatial viewpoint is determined with the projection processing portion 40, based on the adjusted shifting parameter and image data as well as the relation between the information about the arrangement of the images in the virtual 3D space and the information about the spatial viewpoint. In accordance with the 2D arrangement of the images and the adjusted shifting parameter/image data, the display image creation portion creates the 2D display images by processing the read-in image data. The created 2D display images are displayed by the display portion 60.

Thus, with the shifting parameter optimization process technique in accordance with the present invention, the shifting parameters are optimized based on the optical flow, and strain on the eyes of the user performing browsing search or viewing can be suppressed.

EXAMPLE 5

Figure 21:
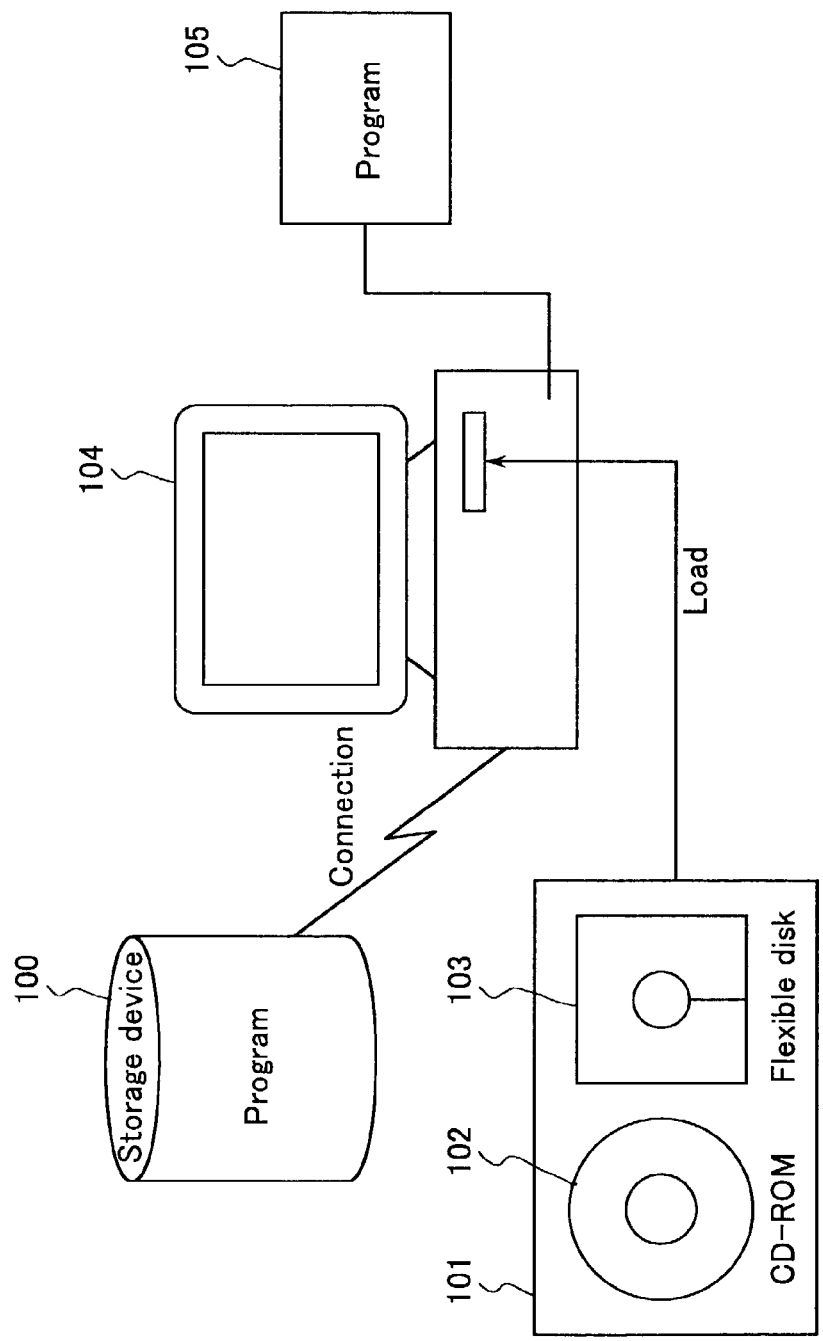
FIG. 21 shows examples of recording media for recording a computer program for realizing the image display processing methods of the present invention.
Figure 22:
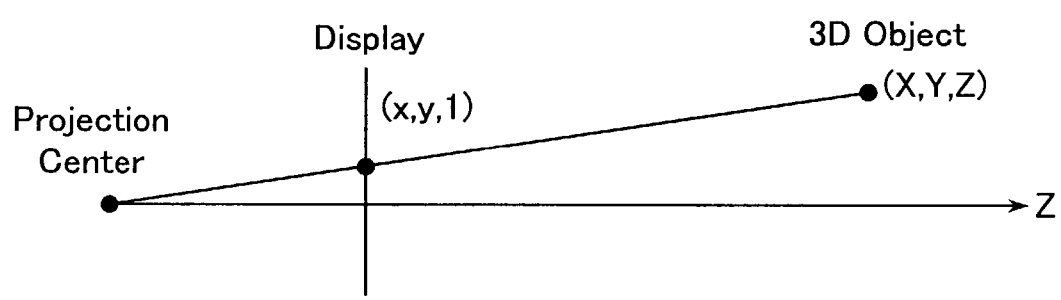
FIG. 22 illustrates how a 3D object located in a 3D space is projected on a display in accordance with a conventional central projection.

The image display method and device of the present invention can be accomplished using any kind of computer by recording a program listing processing steps for realizing the processes explained in the foregoing embodiments on a computer-readable recording medium. The recording medium recording a program comprising the processing steps for realizing the image display method and device of the present invention can be not only a portable recording medium 101, such as a CD-ROM 102 or a flexible disk 103, but also a recording medium 100 in a storage device on a network, or a recording medium 105 such as a hard disk or RAM of a computer, as shown by the examples of recording media depicted in FIG. 21, and when executing the program, the program is loaded into a computer 104, and executed in its main memory.

It should be noted that the above-described 3D display processing acceleration techniques, the 3D space rendering techniques using a background image, and the shifting parameter optimization processing techniques of the present invention can be used independently or in any suitable combination as techniques for improving the image display processing.

INDUSTRIAL APPLICABILITY

With the 3D display processing acceleration techniques of the image display processes of the present invention, a large number of images to be searched in a virtual 3D space can be displayed quickly by using a simplified 2D arrangement in accordance with a parallel expansion projection process.

With the 3D image rendering techniques of the image display processes of the present invention, image rendering that is suitable for the display of a large number of images in the virtual 3D space in a manner that is easily understandable for the user is possible by using multi-resolution synthesized images or cut images.

With the 3D space rendering techniques using a background image of the image display processes of the present invention, it is possible to display a background object image serving as a guide that makes the arrangement position in the virtual 3D space easy to understand, and to render images such that their position in the virtual 3D space is easy to understand.

With the shifting parameter optimization processing technique of the image display processes of the present invention, it is possible to suppress strain on the eyes of the user performing the browsing search or viewing, by optimizing a shifting parameter based on the optical flow.

The following items are additionally disclosed regarding the above explanations and the subject matter in the patent claims:

(1) The image display method according to Claim 1, wherein the arrangement information of the images is set such that the orientation of all images is perpendicular to the display screen, and all images face straightly to the display screen.

(2) The image display method according to Claim 1, wherein the arrangement information of the images is set such that the direction of the pixels of all images is parallel to the direction of the pixels on the display screen.

(3) The image display method according to Claim 2, wherein the expansion/shrinking process regarding the size of the images seen from the spatial viewpoint in the parallel expansion projection process further comprises a process of projecting distant images with excessive shrinkage in which a shrinking ratio is applied that is larger than the shrinking ratio proportional to the distance between the spatial viewpoint and the images, determined from the relation between the information about the arrangement of the images in the virtual 3D space and the spatial viewpoint information, and a process of projection with excessive shrinkage is performed in which the further away the images are, the larger the shrinking ratio is.

(4) The image display method according to Claim 1, wherein, in the process of writing image data in accordance with the simplified 2D arrangement of the images in the display image creation process, the process of writing the images is omitted when an orientation of the images indicated by the simplified 2D arrangement is outside a preset range.

(5) The image display method according to Claim 1, further comprising a process of setting a distribution of the brightness on the display images, wherein, in the process of writing image data in accordance with the simplified 2D arrangement of the images in the display image creation process, the process of writing the images is performed by image brightness in accordance with the set distribution of the brightness on the display images.

(6) The image display method according to Claim 1, further comprising a process of setting a blurring distribution of the images on the display images, wherein, in the process of writing image data in accordance with the simplified 2D arrangement of the images in the display image creation process, the writing of the images is performed with a process of blurring the images in accordance with the set blurring distribution on the display images.

(7) The image display method according to Claim 1, further comprising a process of setting a color distribution of the images on the display images, wherein, in the process of writing image data in accordance with the simplified 2D arrangement of the images in the display image creation process, the writing of the images is performed with a process of coloring frame lines of the images in accordance with the set color distribution on the display images.

What is claimed is:

1. An image display method for arranging and displaying images in a virtual 3D space, comprising:
    a process of reading in image data of at least one image;
    a process of reading in information about an arrangement of the images in the virtual 3D space;
    a spatial viewpoint setting/shifting process in which setting and shifting of a spatial viewpoint is specified with parameters including a viewpoint position and a line of sight direction in the virtual 3D space;
    a process of converting original shapes of the read-in image data by a parallel expansion projection process including a parallel shifting process regarding the directions in which the images are seen from the spatial viewpoint and an expansion/shrinking process regarding their size, based on a relation between the information about the arrangement of the images in the virtual 3D space and the spatial viewpoint information, and determining a simplified 2D arrangement expressing 2D arrangement of the images seen from the spatial viewpoint as a 2D arrangement of images with shapes that are similar to the original images and a process of rotating an original shape of the read-in image data into an angle of multiples of 90°, based on the relation between the information about the arrangement of the images in the virtual 3D space and the spatial viewpoint information;
    a display image creation process of creating displayed images by processing the read-in image data in accordance with the determined simplified 2D arrangement of the images; and
    a process of displaying the created display images on a display device.

2. An image display method for arranging and displaying images in a virtual 3D space, comprising:
    a process of reading in image data of at least one image;
    a process of reading in information about an arrangement of the images in the virtual 3D space;
    a spatial viewpoint setting/shifting process in which setting and shifting of a spatial viewpoint is specified with parameters including a viewpoint position and a line of sight direction in the virtual 3D space;
    process of converting original shapes of the read-in image data by a parallel expansion projection process including a parallel shifting process regarding the directions in which the images are seen from the spatial viewpoint and an expansion/shrinking process regarding their size based on a relation between the information about the arrangement of the images in the virtual 3D space and the spatial viewpoint information, and determining a simplified 2D arrangement expressing a 2D arrangement of the images seen from the spatial viewpoint as a 2D arrangement of images with shapes that are similar to the original images;
    a display image creation process of creating displayed images by processing the read-in image data in accordance with the determined simplified 2D arrangement of the images;
    a process of displaying the created display images on a display device;
    a process of writing image data in accordance with the simplified 2D arrangement of the images in the display image creation; and
    a process of writing a substitution image or substitution-related information if an orientation of the images displayed in the simplified 2D arrangement is outside a range of preset values.

3. An image display method for arranging and displaying images in a virtual 3D space, comprising:
    an image data reading process of reading in image data of at least one image with at least one resolution, wherein the image data are multi-resolution image data made of a set of image data of at least one resolution;
    a process of reading in information about an arrangement of the images in the virtual 3D space;
    a spatial viewpoint setting/shifting process in which setting and shifting of a spatial viewpoint is specified with parameters including a viewpoint position and a line of sight direction in the virtual 3D space;
    a process of determining a 2D arrangement of position, orientation and size of the images seen from the spatial viewpoint, by performing a projection process based on a relation between the information about the arrangement of the images in the virtual 3D space and the spatial viewpoint information;
    a display image creation process of selecting the image data of at least one resolution from the read-in multi-resolution image data, in accordance with the determined 2D arrangement, and writing them into display images to create the display images; and
    a process of displaying the created display images on a display device.

4. The image display method according to claim 3, wherein the image data reading process can be selected from
    a process of reading in all sets of multi-resolution image data of the read-in images prior to the display image creation process; and
    a process of reading in, at the time when image data of one resolution has been selected in the display image creation process, only the selected resolution image data from the multi-resolution image data of the read-in images.

5. The image display method according to claim 4, further comprising an image data deletion process of deleting those image data that have become obsolete from memory, which have been read in with the process of reading in image data,
    wherein the image data deletion process can be selected from a process of deleting the image data that have become obsolete when an image data recording capacity has exceeded a preset capacity in memory, and a process of deleting image data of other resolutions when image data of at least one resolution have been selected in the display image creation process.

6. The image display method according to claim 3,
    further comprising a multi-resolution image data creation process of creating the multi-resolution image data from the original image data of the images,
    wherein the multi-resolution image data creation process includes a process of dividing the original image data into a plurality of partial regions and retrieving only specified partial regions, a process of creating image writing frames adapted to a size of the created images of various resolutions, a process of writing of data into corresponding positions of the image writing frames while adapting to the size of the image writing frames and maintaining the size of the retrieved partial regions as large as possible, and a process of creating the data of one synthesized image by omitting the writing of data into the not-yet-written portions of the image writing frames, wherein, in the display image creation process, the synthesized image data corresponding to a hierarchy of selected resolutions are written into the display images, creating the display images.

7. The image display method according to claim 6, wherein, in the multi-resolution image data creation process, the process of retrieving only the specified partial regions is a process of specifying those specifying partial regions of the plurality of partial regions into which the original images have been divided for which a differential value of the image data is larger than a preset value.

8. An image display method for arranging and displaying images in a virtual 3D space, comprising:

a process of reading in image data of at least one image;
a process of reading in information about an arrangement of the images in the virtual 3D space;
a spatial viewpoint setting/shifting process in which setting and shifting of a spatial viewpoint is specified with parameters including a viewpoint position and a line of sight direction in the virtual 3D space;
a process of determining a 2D arrangement of position, orientation and size of the images seen from the spatial viewpoint, by performing a projection process based on a relation between the information about the arrangement of the images in the virtual 3D space and the spatial viewpoint information;
a display image creation process of writing into the display images cut image data in which a region of a size of an image of the 2D arrangement has been cut from the read-in image data in accordance with the determined 2D arrangement to create the display images; and
a process of displaying the created display images on a display device.

9. The image display method according to claim 8, wherein, in the display image creation process, the region that is cut as the cut image data is taken to be a region of the read-in image data in which a differential value of the image data is larger than a preset value.

10. An image display meted for arranging and displaying images in a virtual 3D space, comprising:

a process of reading in image data of at least one image;
a process of reading in information about an arrangement of the images in the virtual 3D space;
a process of reading in image data of a background image that exists virtually as a background in the virtual 3D space;
a process of reading in information about an arrangement of the background image in the virtual 3D space;
a spatial viewpoint setting/shifting process in which setting and shifting of a spatial viewpoint is specified with parameters including a viewpoint position and a line of sight direction in the virtual 3D space;
a process of determining a 2D arrangement of position, orientation and size of the images and the background image seen from the spatial viewpoint, by performing a projection process based on a relation between the information about the arrangement of the images and the background image in the virtual 3D space and the spatial viewpoint information;
a display image creation process of creating display images by processing the read-in image data and background image data in accordance with the determined 2D arrangement of the images and the background image; and
a process of displaying the created display images on a display device.

11. The image display method according to claim 10, wherein, in the display image creation process, the display images are created by switching the background image data between prepared image data that have been shot of a prepared background object and computer graphics data of the background object, in correspondence to the 2D arrangement of the background image seen from the spatial viewpoint.

12. An image display device for arranging and displaying images in a virtual 3D space, comprising:

an image input portion for reading in image data of at least one image;
an arrangement information input portion for reading in information about an arrangement of the images in the virtual 3D space;
a spatial viewpoint setting/shifting portion that specifies setting and shifting of a spatial viewpoint with parameters including a viewpoint position and a line of sight direction in the virtual 3D space;
a projection processing portion for converting original shapes of the read-in image data by a parallel expansion projection process including a parallel shifting process regarding the directions in which the images are seen from the spatial viewpoint, an expansion/shrinking process regarding their size, based on a relation between the information about the arrangement of the images in the virtual 3D space and the spatial viewpoint information, and determining a simplified 2D arrangement expressing a 2D arrangement of the images seen from the spatial viewpoint as a 2D arrangement of images with shapes that are similar to the original images and a process of rotating an original shape of the read-in image data into an angle multiples of 90°, based on the relation between the information about the arrangement of the images in the virtual 3D space and the spatial viewpoint information;
a display image creation processing portion for creating displayed images by processing the read-in image data in accordance with the determined simplified 2D arrangement of the images; and
a display portion for displaying the created display images on a display device.

13. An image display device for arranging and displaying images in a virtual 3D space, comprising:

an image input portion for reading in image data of at least one image with at least one resolution, wherein the image data are multi-resolution image data made of a set of image data of at least one resolution;
an arrangement information input portion for reading in information about an arrangement of the images in the virtual 3D space;
a spatial viewpoint setting/shifting processing portion that specifies setting and shifting of a spatial viewpoint with parameters including a viewpoint position and a line of sight direction in the virtual 3D space;
a projection processing portion for determining a 2D arrangement of position, orientation and size of the images seen from the spatial viewpoint, by performing a projection process based on a relation between the information about the arrangement of the images in the virtual 3D space and the spatial viewpoint information;

a display image creation processing portion for selecting the image data of at least one resolution from the read-in multi-resolution image data, in accordance with the determined 2D arrangement, and writing them into the display images to create the display images; and a display device for displaying the created display images on a display device.

14. An image display device for arranging and displaying images in a virtual 3D space, comprising:

an image input portion for reading in image data of at least one image;

an arrangement information input portion for reading in information about an arrangement of the images in the virtual 3D space;

a spatial viewpoint setting/shifting processing portion that specifies setting and shifting of a spatial viewpoint with parameters including a viewpoint position and a line of sight direction in the virtual 3D space;

a projection processing portion for determining a 2D arrangement of position, orientation and size of the images seen from the spatial viewpoint, by performing a projection process based on a relation between the information about the arrangement of the images in the virtual 3D space and the spatial viewpoint information;

a display image creation processing portion for writing into the display images cut image data in which a region of a size of an image of the 2D arrangement has been cut from the written image data in accordance with the determined 2D arrangement, to create the display images; and a display portion for displaying the created display images on a display device.

15. A computer-readable recording medium storing a program for realizing an image display method for arranging and displaying images in a virtual 3D space, the program comprising:

a processing step of reading in image data of at least one image;

a processing step of reading in information about an arrangement of the images in the virtual 3D space;

a spatial viewpoint setting/shifting processing step in which setting and shifting of a spatial viewpoint is specified with parameters including a viewpoint position and a line of sight direction in the virtual 3D space;

a processing step of converting original shapes of the read-in image data by a parallel expansion projection process including a parallel shifting process regarding the directions in which the images are seen from the spatial viewpoint and a expansion/shrinking process regarding their size, based on a relation between the information about the arrangement of the images in the virtual 3D space and the spatial viewpoint information, determining a simplified 2D arrangement expressing a 2D arrangement of the images seen from the spatial viewpoint as a 2D arrangement of images with shapes that are similar to the original images and rotating an original shape of the read-in image data into an angle of multiples of 90°, based on the relation between the information about the arrangement of the images in the virtual 3D space and the spatial viewpoint information;

a display image creation processing step of creating displayed images by processing the read-in image data in accordance with the determined simplified 2D arrangement of the images; and a processing step of displaying the created display images on a display device.

16. A computer-readable recording medium storing a program for realizing an image display method for arranging and displaying images in a virtual 3D space, the program comprising:

an image data reading processing step of reading in image data of at least one image with at least one resolution, wherein the image data are multi-resolution image data made of a set of image data of at least one resolution;

a processing step of reading in information about an arrangement of the images in the virtual 3D space;

a spatial viewpoint setting/shifting processing step in which setting and shifting of a spatial viewpoint is specified with parameters including a viewpoint position and a line of sight direction in the virtual 3D space;

a processing step of determining a 2D arrangement of position, orientation and size of the images seen from the spatial viewpoint, by performing a projection process based on a relation between the information about the arrangement of the images in the virtual 3D space and the spatial viewpoint information;

a display image creation processing step of selecting the image data of at least one resolution from the read-in multi-resolution image data, in accordance with the determined 2D arrangement, and writing them into the display images to create the display images; and a processing step of displaying the created display images on a display device.

17. A computer-readable recording medium storing a program for realizing an image display method for arranging and displaying images in a virtual 3D space, the program comprising:

a processing step of reading in image data of at least one image;

a processing step of reading in information about an arrangement of the images in the virtual 3D space;

a spatial viewpoint setting/shifting processing step in which setting and shifting of a spatial viewpoint is specified with parameters including a viewpoint position and a line of sight direction in the virtual 3D space;

a processing step of determining a 2D arrangement of position, orientation and size of the images seen from the spatial viewpoint, by performing a projection process based on a relation between the information about the arrangement of the images in the virtual 3D space and the spatial viewpoint information;

a display image creation processing step of writing into the display images cut image data in which a region of a size of an image of the 2D arrangement has been cut from the written image data in accordance with the determined 2D arrangement to create the display images; and a processing step of displaying the created display images on a display device.

18. A computer-readable recording medium storing a program for realizing an image display method for arranging and displaying images in a virtual 3D space, the program comprising:

a processing step of reading in image data of at least one image;

a processing step of reading in information about an arrangement of the images in the virtual 3D space;

a processing step of reading in image data of a background image that exists virtually as a background in the virtual 3D space;

a processing step of reading in information about an arrangement of the background image in the virtual 3D space;

a spatial viewpoint setting/shifting processing step in which setting and shifting of a spatial viewpoint is specified with parameters including a viewpoint position and a line of sight direction in the virtual 3D space;

a processing step of determining a 2D arrangement of position, orientation and size of the images and the background image seen from the spatial viewpoint, by performing a projection process based on a relation between the information about the arrangement of the images and the background image in the virtual 3D space and the spatial viewpoint information;

a display image creation processing step of creating display images by processing the read-in image data end background image data in accordance with the determined 2D arrangement of the images end the background image; and a processing step of displaying the created display images on a display device.

19. An image display device for arranging and displaying images in a virtual 3D space, comprising:

an image input portion for reading in image data of at least one image;

an arrangement information input portion for reading in information about an arrangement of the images in the virtual 3D space;

a spatial viewpoint setting/shifting portion that specifies setting and shifting of a spatial viewpoint with parameters including a viewpoint position and a line of sight direction in the virtual 3D space;

a projection processing portion for converting original shapes of the read-in image data by a parallel expansion projection process including a parallel shifting process regarding the directions in which the images are seen from the spatial viewpoint and a expansion/shrinking process regarding their size, based on a relation between the information about the arrangement of the images in the virtual 3D space and the spatial viewpoint information, and determining a simplified 2D arrangement expressing a 2D arrangement of the images seen from the spatial viewpoint as a 2D arrangement of images with shapes that are similar to the original images, a process of writing image data in accordance with the simplified 2D arrangement of the images in the display image creation process and a process of writing a substitution image or substitution-related information if an orientation of the images displayed in the simplified 2D arrangement is outside a range of preset values;

a display image creation processing portion for creating displayed images by processing the read-in image data in accordance with the determined simplified 2D arrangement of the images; and a display portion for displaying the created display images on a display device.

20. A computer-readable recording medium storing a program for realizing an image display method for arranging and displaying images in a virtual 3D space, comprising:

a process of reading in image data of at least one image;

a process of reading in information about an arrangement of the images in the virtual 3D space;

a spatial viewpoint setting/shifting process in which setting and shifting of a spatial viewpoint is specified with parameters including a viewpoint position and a line of sight direction in the virtual 3D space;

a process of converting original shapes of the read-in image data by a parallel expansion projection process including a parallel shifting process regarding the directions in which the images are seen from the spatial viewpoint and an expansion/shrinking process regarding their size, based on a relation between the information about the arrangement of the images in the virtual 3D space and the spatial viewpoint information, and determining a simplified 2D arrangement expressing a 2D arrangement of the images seen from the spatial viewpoint as a 2D arrangement of images with shapes that are similar to the original images;

a display image creation process of creating displayed images by processing the read-in image data in accordance with the determined simplified 2D arrangement of the images;

a process of displaying the created display images on a display device;

a process of writing image data in accordance with the simplified 2D arrangement of the images in the display image creation process; and a process of writing a substitution image or substitution-related information if an orientation of the images displayed in the simplified 2D arrangement is outside a range of preset values.

* * * * *

UNITED STATES PATENT AND TRADEMARK OFFICE
CERTIFICATE OF CORRECTION

PATENT NO. : 6,967,651 B2  Page 1 of 1
APPLICATION NO. : 10/162594
DATED : November 22, 2005
INVENTOR(S) : Toshio Endoh et al.

It is certified that error appears in the above-identified patent and that said Letters Patent is hereby corrected as shown below:

Column 31, Line 33, insert - - a - - before "2D".
Column 31, Line 56, insert - - a - - before "process".
Column 31, Line 60, after "size" insert - - , - -.
Column 32, Line 9, delete "creation;" and insert - - creation process; - - therefor.
Column 33, Line 40, after "arrangement" insert - - , - -.
Column 33, Line 49, delete "meted" and insert - - method - - therefor.
Column 34, Line 42, delete "angle" and insert - - angle of - - therefor.
Column 36, Line 53, after "arrangement" insert - - , - -.
Column 37, Line 17, delete "end" and insert - - and - - therefor.
Column 37, Line 18, delete "end" and insert - - and - - therefor.

Signed and Sealed this

Twenty-second Day of August, 2006

JON W. DUDAS
*Director of the United States Patent and Trademark Office*